(12) United States Patent
Schaevitz et al.

(10) Patent No.: US 7,858,261 B2
(45) Date of Patent: Dec. 28, 2010

(54) SYSTEMS AND METHODS FOR STACKING FUEL CELLS

(75) Inventors: Samuel B. Schaevitz, Fremont, CA (US); Aleksander Franz, Winchester, MA (US); Zachary Byars, Cambridge, MA (US); Roger W. Barton, Andover, MA (US)

(73) Assignee: Lilliputian Systems, Inc., Wilmington, MA (US)

( * ) Notice: Subject to any disclaimer, the term of this patent is extended or adjusted under 35 U.S.C. 154(b) by 1224 days.

(21) Appl. No.: 11/416,219

(22) Filed: May 2, 2006

(65) Prior Publication Data

US 2007/0259242 A1 Nov. 8, 2007

(51) Int. Cl.
*H01M 2/14* (2006.01)
*H01M 8/00* (2006.01)
*H01M 8/24* (2006.01)

(52) U.S. Cl. ........................ 429/508; 429/400; 429/452; 429/467; 429/469

(58) Field of Classification Search ........................ None
See application file for complete search history.

(56) References Cited

U.S. PATENT DOCUMENTS

| | | | |
|---|---|---|---|
| 5,089,455 A | 2/1992 | Ketcham et al. |
| 5,190,834 A | 3/1993 | Kendall |
| 5,273,837 A | 12/1993 | Aitken et al. |
| 5,479,178 A | 12/1995 | Ha |
| 5,554,454 A | 9/1996 | Gardner et al. |
| 5,595,833 A | 1/1997 | Gardner et al. |
| 5,750,279 A | 5/1998 | Carolan et al. |
| 5,925,477 A | 7/1999 | Ledjeff et al. |
| 6,183,897 B1 | 2/2001 | Hartvigsen et al. |
| 6,479,178 B2 | 11/2002 | Barnett |
| 6,485,852 B1 | 11/2002 | Miller et al. |
| 6,623,881 B2 | 9/2003 | Badding et al. |
| 6,638,654 B2 | 10/2003 | Jankowksi et al. |
| 6,649,295 B2 | 11/2003 | Hamrock et al. |
| 6,677,070 B2 | 1/2004 | Kearl |
| 6,680,139 B2 | 1/2004 | Narayanan et al. |
| 6,852,436 B2 | 2/2005 | Badding et al. |

(Continued)

FOREIGN PATENT DOCUMENTS

DE      42 13 728      10/1993

(Continued)

OTHER PUBLICATIONS

International Search Report dated Dec. 2, 2008 in PCT/US2008/009465.

*Primary Examiner*—Melvin C Mayes
*Assistant Examiner*—Sarah Van Oudenaren
(74) *Attorney, Agent, or Firm*—Sunstein Kann Murphy & Timbers LLP

(57) ABSTRACT

The invention, in various embodiments, provides planar fuel cell stack of a plurality of fuel cells, comprising an anode layer including a first anode and a second anode, an electrolyte layer, a cathode layer including a first cathode and a second cathode, and at least one interconnect at least partially disposed within the electrolyte layer, and electrically and mechanically coupling the first anode and the second cathode. In various embodiments, structural supports are provided, the fuel cells are sized to be portable, and are manufactured to produce desired power densities and/or voltages.

44 Claims, 24 Drawing Sheets

U.S. PATENT DOCUMENTS

| | | |
|---|---|---|
| 6,939,632 B2 | 9/2005 | Arana et al. |
| 2003/0039874 A1* | 2/2003 | Jankowski et al. ............ 429/26 |
| 2003/0077498 A1 | 4/2003 | Cable et al. |
| 2003/0096147 A1 | 5/2003 | Badding et al. |
| 2003/0118879 A1 | 6/2003 | Barnett et al. |
| 2003/0194592 A1 | 10/2003 | Hilliard |
| 2004/0028975 A1 | 2/2004 | Badding et al. |
| 2004/0053100 A1 | 3/2004 | Stanley et al. |
| 2004/0072039 A1 | 4/2004 | Jankowski et al. |
| 2004/0115503 A1 | 6/2004 | Jacobson et al. |
| 2004/0241061 A1 | 12/2004 | Takai et al. |
| 2005/0008909 A1* | 1/2005 | Kaye et al. .................... 429/20 |
| 2005/0069737 A1 | 3/2005 | Nomura et al. |
| 2005/0132648 A1 | 6/2005 | Miyahara et al. |
| 2005/0221131 A1 | 10/2005 | Roy et al. |
| 2005/0227134 A1 | 10/2005 | Nguyen |
| 2005/0249993 A1 | 11/2005 | Horiuchi et al. |
| 2006/0263665 A1* | 11/2006 | Schaevitz et al. ............ 429/34 |
| 2007/0259242 A1 | 11/2007 | Schaevitz et al. |

FOREIGN PATENT DOCUMENTS

| | | |
|---|---|---|
| DE | 102 19 096 | 11/2003 |
| EP | 0 338 823 | 10/1989 |
| EP | 0 482 783 | 4/1992 |
| EP | 1 353 394 | 10/2003 |
| EP | 1 508 932 | 2/2005 |
| JP | 2005 322452 | 11/2005 |
| WO | WO-96 29751 | 9/1996 |
| WO | WO-03/081693 | 10/2003 |
| WO | WO-2005/015675 | 2/2005 |
| WO | WO 2005/030376 | 4/2005 |
| WO | WO-2006 125218 | 11/2006 |

* cited by examiner

SYSTEMS AND METHODS FOR STACKING FUEL CELLS

BACKGROUND

Fuel cells produce electricity from chemical reactions. The chemical reactions typically react a fuel, such as hydrogen, and air/oxygen as reactants, and produce water vapor as a primary by-product. The hydrogen can be provided directly, in the form of hydrogen gas, or can be produced from other materials, such as hydrocarbon liquids or gasses, which are reformed to isolate hydrogen gas. Fuel cell assemblies may include one or more fuel cells in a fuel cell housing that is coupled with a fuel canister containing the hydrogen and/or hydrocarbons. Fuel cell housings that are portable coupled with fuel canisters that are portable, replaceable, and/or refillable, compete with batteries as a preferred electricity source to power a wide array of portable consumer electronics products, such as cell phones and personal digital assistants. The competitiveness of these fuel cell assemblies when compared to batteries depends on a number of factors, including their size, efficiency, and reliability.

However, these factors are constrained by limitations in the art. For example, existing fabrication methods limit the number of fuel cell units that can be housed within a fuel cell housing of a given size. Additionally, each fuel cell in a housing includes a limited region in which it produces electricity, known as the active area of the fuel cell, and existing fabrication methods limit the active areas of each of the fuel cell units. Moreover, existing fabrication methods do not balance the design tradeoffs inherent to portable fuel cells. Certain fuel cells operate at extremely high temperatures, which thermally stresses fuel cell components and may disable the fuel cell. Existing devices do not adequately support the fuel cell components to withstand the stresses.

Thus, a need exists for fuel cell assemblies and fabrication methods that provide fuel cells which overcome limitations in the art.

SUMMARY

This invention, in various embodiments, addresses deficiencies in the prior art by arranging a plurality of fuel cell units in one or more planar stacks within a fuel cell housing, and electrically coupling the fuel cell units to provide increased voltages, currents, and/or power. In certain embodiments, a manufacturer adjusts design parameters, including physical dimensions of fuel cell components, to balance fundamental tradeoffs inherent to portable planar fuel cell stacks. More particularly, in one aspect, the fuel cell units are arranged efficiently within the planar stacks such that each fuel cell unit has an active area of more than about 70%. In one aspect, the planar stacks are contained in a fuel cell housing that is less than about 30 cubic centimeters and/or produces more than about 0.1 volts per cubic centimeter of the housing. In certain configurations, the fuel cell assemblies disclosed herein produce more than about 0.5 volts per cubic centimeter, and in others more than about 2 volts per cubic centimeter. In another aspect, the planar stacks are provided in a housing having a volume of between about 0.1 cubic centimeters and about 30 cubic centimeters, and have active areas of between about 0.5 square centimeters and about 100 square centimeters. In certain configurations, the active areas are between about 0.5 square centimeters and about 20 square centimeters, or between about 2 square centimeters and about 10 square centimeters. In certain embodiments, the invention includes structural supports disposed on the fuel cell that reduce thermal stress from, for example, high temperatures and thermal cycles. In one aspect, the invention includes methods of fabricating the fuel cell units, the structural supports, and other structures using micron-level fabrication techniques such as etching. In another aspect, groups of fuel cell units are arranged in respective planar stacks. By varying the number of fuel cell units in the groups and/or varying the size of individual fuel cell units, a manufacturer improves certain performance metrics, such as power density and/or voltage production.

In one aspect, the devices include a planar fuel cell stack of a plurality of fuel cells, comprising an anode layer including a first anode and a second anode, an electrolyte layer, a cathode layer including a first cathode and a second cathode, at least one interconnect at least partially disposed within the electrolyte layer, and electrically and mechanically coupling the first anode and the second cathode, and an elongate structural support oriented perpendicular to a plane extending through the planar stack and at least partially disposed laterally between two adjacent electrodes.

In one configuration, the stack further includes a second structural support in contact with the stack and spaced apart from the elongate structural support. The stack may include an insulating material. For example, the structural support includes an electrically insulating coating. In one feature, the structural support includes an oxidized surface. The structural support may include one or more of a silicon material, a yttria stabilized zirconia (YSZ) material, a magnesium oxide material, a ferro-chromium material, and a ceramic material.

In certain configurations, the structural support has a width of between about 30 microns and about 200 microns, and a height of greater than about 100 microns. In one configuration, the structural support mechanically couples with the electrolyte later.

According to one feature, the first anode and the second anode are laterally separated by a first distance, the first cathode and the second cathode are laterally separated by a second distance, and at least one of the first distance and the second distance is between about 5 microns and about 500 microns. For example, at least one of the first distance and the second distance can be between about 5 microns and about 200 microns.

In one feature, the stack of claim 1, wherein the electrolyte layer includes a first electrolyte region disposed between the first anode and the first cathode and providing a first voltage differential between the first anode and the first cathode, a second electrolyte region disposed between the second anode and the second cathode and providing a second voltage differential between the second anode and the second cathode and the first electrolyte region and the second electrolyte region comprise a monolithic electrolyte structure.

According to certain configurations, the stack comprises one or more of a solid-oxide fuel cell and a proton exchange membrane fuel cell.

According to one feature, the stack includes active regions of the electrolyte layer wherein respective anodes and cathodes have overlapping projections on a surface of the electrolyte layer, and the active regions comprise at least 70% of an area of the surface of the electrolyte layer. The stack may be contained within a housing having a volume of less than about 30 cubic centimeters. The stack may produce a voltage differential of more than about 5 volts, and in some configurations more than about 10 volts or more than about 15 volts. The at least one interconnect may have a cross-section parallel to a plane extending through the electrolyte layer of less than about $(100 \text{ microns})^2$. The stack may further include a plurality of interconnects at least partially disposed within the electrolyte layer, and electrically and mechanically coupling the first anode and the second cathode. The plurality of interconnects may comprise a linear array of interconnects, wherein the center-to-center spacings of adjacent ones of the plurality of interconnects are substantially equal.

In one feature, the stack includes three or more fuel cells electrically connected in series, wherein the three or more fuel cells comprise a non-linear array of fuel cells. The devices may include two or more series electrical connections of the fuel cells coupled in a parallel electrical connection.

In one aspect, the devices include a planar fuel cell stack of a plurality of fuel cells, comprising an anode layer including a first anode and a second anode, an electrolyte layer, a cathode layer including a first cathode and a second cathode, at least one interconnect at least partially disposed within the electrolyte layer, and electrically and mechanically coupling the first anode and the second cathode, and an elongate structural support oriented perpendicular to a plane extending through the planar stack and having at least a portion of the elongate structural support aligned with the at least one interconnect on an axis perpendicular to a plane extending through the fuel cell stack The plurality of fuel cells may comprise one or more of solid oxide fuel cells and/or proton exchange membrane (PEM) fuel cells. The structural support may have a width of between about 30 microns and about 200 microns, and a height of greater than about 100 microns. In one configuration, the first anode and the second anode are laterally separated by a first distance, the first cathode and the second cathode are laterally separated by a second distance, and at least one of the first distance and the second distance is between about 5 microns and about 500 microns.

In one feature, the stack is contained within a housing having a volume of less than about 30 cubic centimeters. The stack may produce a voltage differential of more than about 10 volts.

In another aspect, the devices include a fuel cell assembly, comprising a housing having a volume of less than about 30 cubic centimeters, and a planar fuel cell stack contained in the housing and having an anode layer including a plurality of anodes arranged in a first plane, a cathode layer including a plurality of cathodes arranged in a second plane, and an electrolyte layer disposed between the anode layer and the cathode layer, wherein the stack includes active regions of the electrolyte layer wherein respective anodes and cathodes have overlapping projections on a surface of the electrolyte layer, and the active regions comprise at least about 50% of an area of the surface of the electrolyte layer. In certain configurations, the active regions comprise at least about 70% or at least about 85% of an area of the surface of the electrolyte layer.

In one aspect, the devices include a fuel cell assembly, comprising a housing, and a planar fuel cell stack contained in the housing and having respective anodes arranged in an anode layer, respective cathodes arranged in a cathode layer, and an electrolyte layer, wherein the fuel cell assembly produces more than about 0.1 volts per cubic centimeter of the housing.

According to one feature, the housing has a volume of less than about 30 cubic centimeters.

In another aspect, the devices include a fuel cell assembly, comprising a housing having a volume of between about 0.1 cubic centimeters and about 30 cubic centimeters, and a planar fuel cell stack having an anode layer including a plurality of anodes arranged in a first plane, a cathode layer including a plurality of cathodes arranged in a second plane, and an electrolyte layer disposed between the anode layer and the cathode layer, wherein the stack includes active regions of the electrolyte layer wherein respective anodes and cathodes have overlapping projections on a surface of the electrolyte layer, and the active regions have an area on the surface of the electrolyte layer of between about 0.5 square centimeters and about 100 square centimeters.

In one aspect, the methods include a method of fabricating a planar fuel cell stack with at least one structural support, comprising providing a substrate, disposing an electrolyte layer and one or more electrode layers above the substrate, and forming the at least one structural support from the substrate by selectively removing portions of the substrate.

According to one configuration, the at least one structural support is formed to be elongate and extend perpendicular to a plane extending through the electrolyte. In one feature, selectively removing portions of the substrate comprises etching the substrate. In one feature, the methods include coating the at least one structural support with an insulating material. For example, the methods may include oxidizing the at least one structural support. The method may include disposing the electrolyte directly on the substrate.

In one feature, the methods include providing an anode layer including a first anode and a second anode, providing a cathode layer including a first cathode and a second cathode, and electrically and mechanically interconnecting the first anode and the second cathode through the electrolyte layer. At least one of providing an anode layer and providing a cathode layer may include providing a dam structure on the electrolyte to define a first electrode region and a second electrode region, and disposing electrode material on the first electrode region and the second electrode region. The dam structure may comprise the structural support. The methods may further include removing the dam structure to define at least two electrodes.

The methods may include electrically and mechanically interconnecting the first anode and the second cathode includes etching microfeatures within the electrolyte layer and disposing conductive material within the microfeatures. Etching microfeatures may include etching a linear array of microfeatures with center-to-center spacings of adjacent ones of the microfeatures being substantially equal. Etching a plurality of microfeatures may include etching microfeatures having respective cross-sections with respective areas of less than about $(100\ microns)^2$. In one feature, the plurality of microfeatures are etched within a monolithic electrolyte structure.

Thus, the systems and methods described herein arrange many fuel cell units in a single fuel cell housing sized for use in portable electronics devices; provide fuel cells with high active areas; produce high power densities while being sized and shaped for portable electronics applications; provide fabrication methods that balance design tradeoffs inherent in portable fuel cell assemblies, and withstand high thermal stress.

BRIEF DESCRIPTION OF THE DRAWINGS

These and other features and advantages will be more fully understood by the following illustrative description with reference to the appended drawings, in which like elements are labeled with like reference designations and which may not be drawn to scale.

DETAILED DESCRIPTION OF ILLUSTRATIVE EMBODIMENTS

Figure 1:
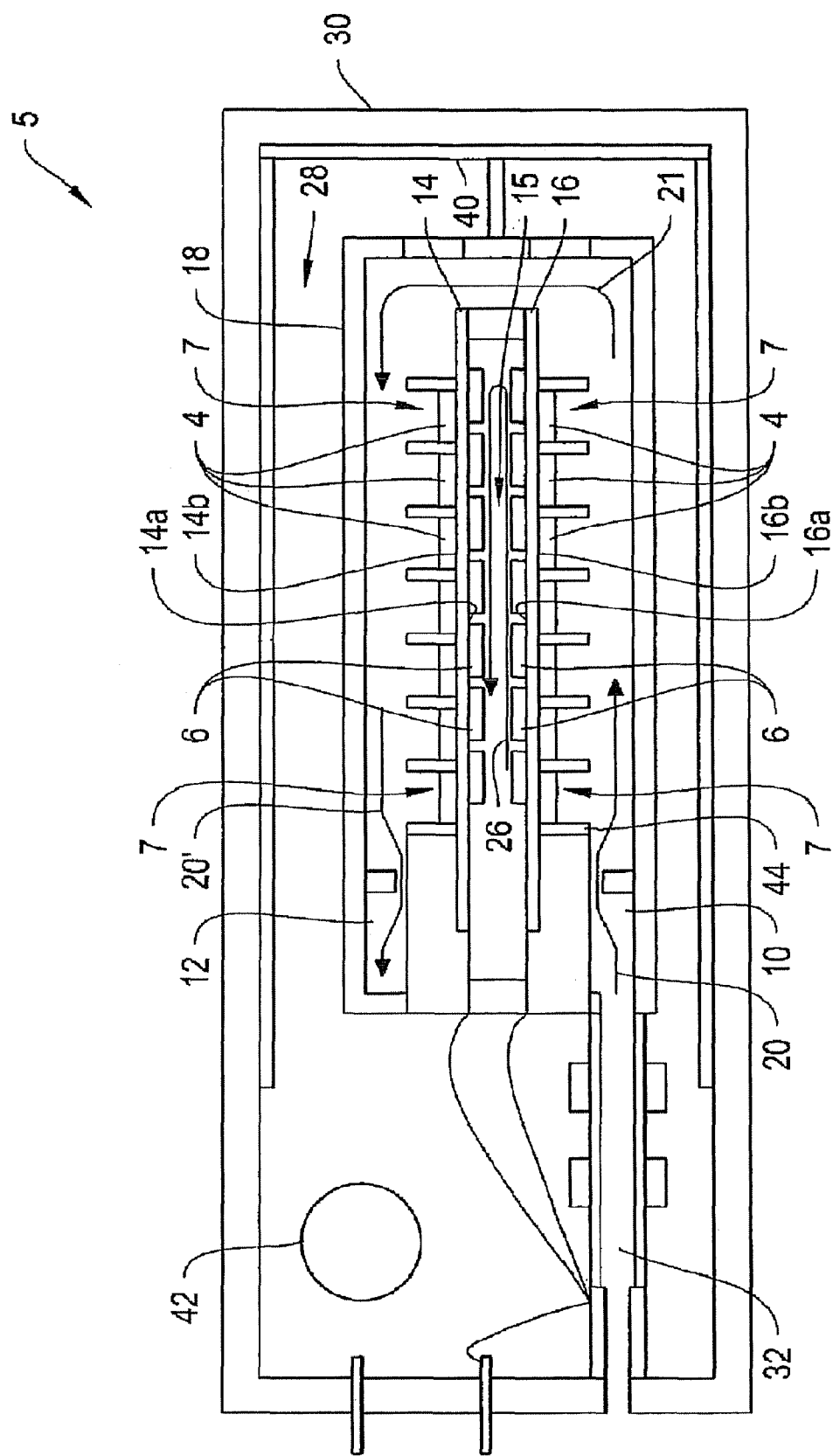
FIG. 1 shows a fuel cell assembly according to an illustrative embodiment of the invention.

The invention, in various embodiments, provides devices and methods for portable fuel cell assemblies. FIG. 1 shows a fuel cell assembly 5 according to an illustrative embodiment of the invention. In particular, the fuel cell assembly 5 includes a plurality of fuel cell units, of which certain exemplary fuel cell units are depicted by reference numeral 7. Each of the fuel cell units 7 includes an anode 4 and a cathode 6 disposed on either an electrolyte/membrane layer 14 or an electrolyte membrane layer 16. The fuel cell units 7 electrically connect in series via electrical interconnects (not shown) that will be discussed in more detail below. The assembly 5 further includes a fuel reformer 10 and a tail gas burner 12 contained within a housing 18. The fuel cell assembly 5 may also include a fuel canister (not shown).

The fuel cell units 7 produce electricity when a fuel contacts the anodes 4 and oxygen contacts the cathodes 6. Exemplary types of fuel include hydrogen, carbon monoxide, hydrocarbon based fuels such as methane, ethane, methanol, butane, pentane, methanol, formic acid, ethanol, and/or propane, and/or non-hydrocarbon based fuels such as ammonia or hydrazine. The anodes 4 and cathodes 6 may be porous, and catalyst (e.g., a platinum based catalyst) is optionally disposed at the interfaces of the anodes 4 and the electrolyte layers 14 and 16 and/or at the interfaces of the cathodes 6 and the electrolyte layers 14 and 16. The hydrogen and oxygen electrochemically react with the anodes 4, the cathodes 6, the electrolyte membranes 14 and 16, and catalysts (not shown) to produce voltage differentials between respective anodes and cathodes. The respective voltage differentials created by the fuel cells 7 combine through the series connection of fuel cells 7, and can be used to drive electrical current and power a load (not shown).

In operation, a fuel stream 20 enters through the fuel inlet 32. The fuel stream 20 can include liquid or gas, and can comprise the exemplary fuel types described above. Providing the fuel cell units 7 with pure hydrogen may improve the efficiency of the assembly 5, and thus in certain embodiments, such as when a hydrocarbon based fuel is used, the fuel stream 20 may pass through a reformer region 10 and chemically react with catalysts in the reformer region 10 to isolate/produce hydrogen and/or carbon monoxide from the fuel stream 20. However, if the fuel stream 20 comprises pure hydrogen or if the fuel cell units 7 are configured to operate directly with the other fuel types mentioned above, the reformer region 10 is not necessary. The reformer region 10 can comprise one or more of a steam reformer, a partial oxidation reformer, a preferential oxidation reformer, an aqueous shift reformer, and/or a thermal cracking reformer. The actual reformer used will depend upon the Application, and any suitable reformer may be employed.

The fuel stream 20, including hydrogen gas produced by the reformer region 10, then flows along path 21 and contacts the anodes 4 before flowing through tail gas burner 12, where the unexhausted fuel combusts with oxygen (not shown). Additionally, an air stream 26, which can comprise air and/or oxygen gas, flows through internal routing channels (not shown) and contacts the cathodes 6 through the air routing layer 15. As mentioned above, the cathodes 6 and anodes 4 include pores (not shown), and as a result the hydrogen and oxygen/air flow through the pores and contact the electrolyte membranes 14 and 16. When hydrogen and oxygen contact the cathodes 6, anodes 4, and electrolyte membranes 14 and 16, they electrochemically react to produce electricity.

More particularly, the fuel cell assembly 5 includes a plurality of anodes 4 disposed on the outer surface 16b of the electrolyte membrane layer 16 and the outer surface 14b of the electrolyte membrane layer 14, a plurality of cathodes 6 disposed on the inner surface 16a of the electrolyte membrane layer 16 and the inner surface 14a of the electrolyte membrane layer 14, and structural supports 44 disposed on electrolyte membranes 14 and 16. The cathodes 6 disposed on surface 14a directly face the cathodes 6 disposed on surface 16a of membrane 16. This is beneficial in part because both cathode layers share the same flow of air 26 and air routing channel 15, and thus do not require separate air routing channels. In certain embodiments, the air routing channel 15 can be as thin as 1.0 mm or thinner than about 0.5 mm.

The anodes 4 can be constructed of a wide variety of materials, including cermet composites such as nickel and YSZ cermets, platinum, silver, palladium, iron, cobalt, ceria, other oxide matrix materials, or combinations thereof. The cathodes can be constructed from lanthanum (strontium) manganate (LSM), lanthanaum (strontium) cobaltite (LSC), and lanthanum (strontium) cobalt-ferrite (LSCF). The electrolyte layers 14 and 16 can comprise yttria-stabilized zirconia (YSZ) and/or doped ceria materials. Other materials, configurations, and fabrication methods for the electrolyte layers 14 and 16 are described in PCT application WO 2005/030376, incorporated herein by reference in its entirety.

The electrolyte membranes 14 and 16 are vulnerable to thermal stresses due to thermal cycling of the fuel cell (for example, when the fuel cell is turned on and off repeatedly), and structural supports 44 add structural integrity to the electrolyte membranes 14 and 16. The structural supports 44 will be discussed in more detail below.

The anodes 4, cathodes 6, and electrolyte membranes 14 and 16 are contained within a first/inner housing 18. The inner housing 18 can have a volume of between about 0.1 cubic centimeters and about 100 cubic centimeters. In certain embodiments, the inner housing 30 has a volume of between about 0.1 cubic centimeters and about 30 cubic centimeters, between about 0.1 cubic centimeters and about 10 cubic centimeters, or between about 1 cubic centimeter and about 5 cubic centimeters.

The depicted housing 18 comprises a thermally conductive material, and thus the housing comprises a substantially isothermal zone. This is beneficial so that all of the components within the housing operate at substantially the same temperature.

In certain embodiments, the operating temperature within the inner housing 18 is more than 400 degrees C., and in other embodiments can be greater than 750 degrees C. Thus, to maintain this temperature and in order to protect an end-user from these high temperatures, the inner housing 18 is housed in an outer housing 30 that is thermally isolated from the inner housing 18 by an insulating volume 28. The insulating volume 28 may comprise a variety of insulating materials with low thermal conductance, but in certain embodiments, the insulating volume comprises a low pressure region and in some cases comprises a vacuum. In order to maintain a vacuum, a getter material 42 absorbs background gases and maintains vacuum-like conditions. In certain embodiments, the getter material 42 comprises non-evaporable getter, which can be activated through electrical heating.

A vacuum, however, may not prevent/eliminate the heat loss due to radiation. Thus the outer housing 30 includes radiation reflectors 40 on its inner surfaces. The reflectors 40 can comprise a metallic coating which is deposited on the inner surfaces of the wall 30, or by means of a metallic or infrared reflective material which is mechanically attached to the inner surfaces of the vacuum wall. In addition, a series of parallel infrared reflectors can be provided between the inner and outer surfaces of the outer housing 30. As mentioned above, the fuel cell assembly 5 may be portable, and in certain embodiments the outer housing 30 can have a volume of between about 0.1 cubic centimeters and about 100 cubic centimeters. In certain embodiments, the outer housing 30 has a volume of between about 0.1 cubic centimeters and about 30 cubic centimeters, between about 0.1 cubic centimeters and about 10 cubic centimeters, or between about 1 cubic centimeter and about 5 cubic centimeters.

Figure 2A:
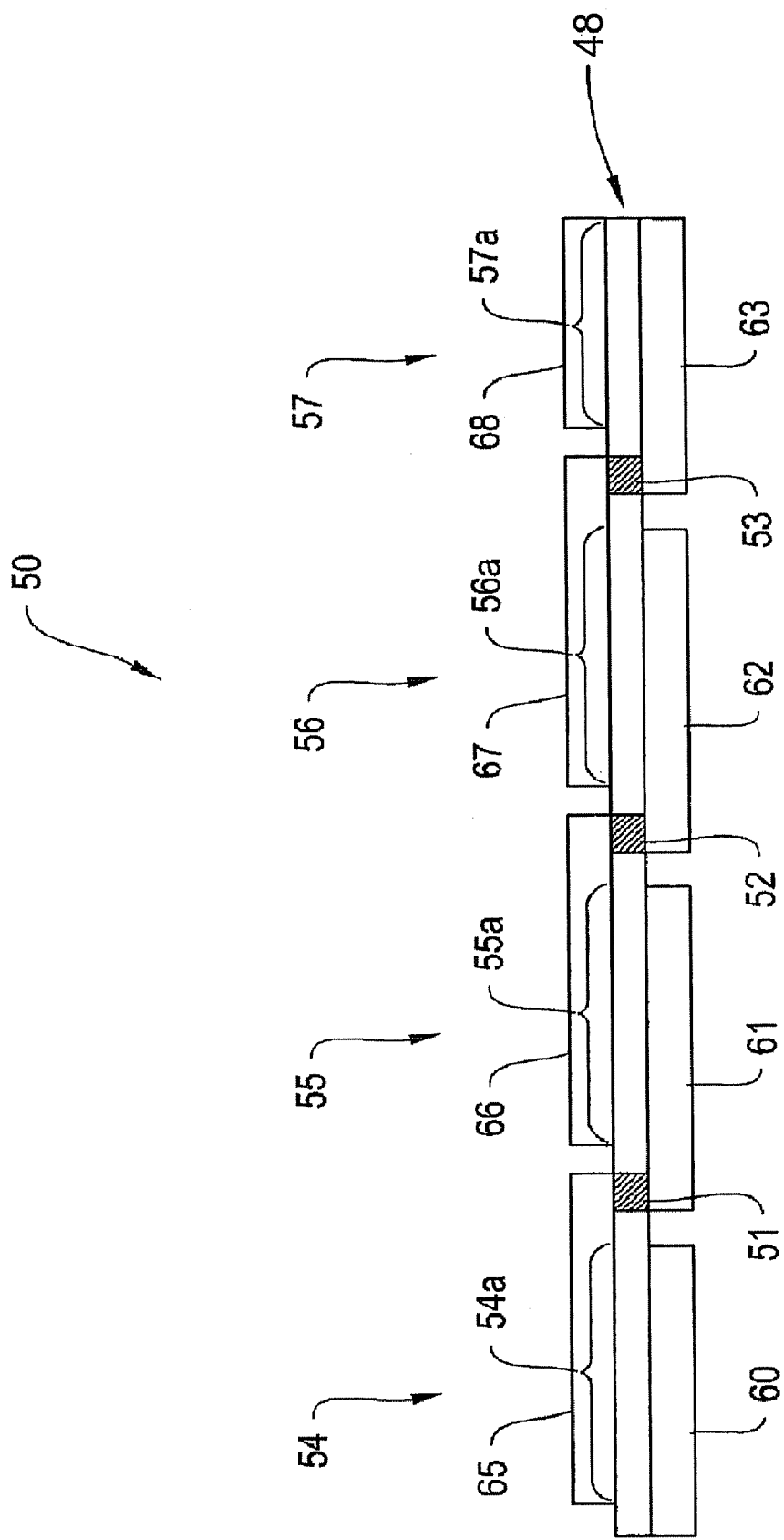
FIG. 2A shows a cross-sectional view of a planar stack of fuel cell units according to an illustrative embodiment of the invention.

FIG. 2A shows a cross-sectional view of a planar fuel cell stack 50 of fuel cell units 54-57 according to an illustrative embodiment of the invention. In particular, the fuel cell units 54-57 are similar to the fuel cell units 7 of FIG. 1, and include an electrolyte membrane 48 similar to the electrolyte membranes 14 and 16 of FIG. 1. Each fuel cell unit 54-57 includes a respective anode 60-63 and a respective cathode 65-68. The anodes 60-63 are arranged in a first plane, and the cathodes 65-68 are arranged in a second plane. The cathode of each fuel cell unit electrically couples to the anode of an adjacent fuel cell via electrical interconnects 51-53. In particular, cathode 65 of fuel cell unit 54 electrically couples to anode 61 of fuel cell 55 via interconnect 51, cathode 66 of fuel cell unit 55 electrically couples to anode 62 of fuel cell unit 56 via interconnect 52, and cathode 67 electrically couples to anode 63 of fuel cell unit 57 via interconnect 53. Although the depicted anodes 60-63 lie on an upper surface of the electrolyte 48 and the depicted cathodes 60-63 lie under a lower surface of the electrolyte 48, this need not be the case, and in particular the placement of the anodes 60-63 and the cathodes 60-63 can be reversed. More generally, in any of the fuel cell assembly configurations described herein, the fuel cell units can be rearranged symmetrically with the placement of the anodes and the cathodes reversed and the flow of fuel and oxygen/air correspondingly switched so that the fuel contacts the anodes and the oxygen/air contacts the cathodes.

In operation, the interconnects 51-53 connect the fuel cell units 54-57 in series and provide additive voltage gains. In particular, during operation the electrochemical reactions of fuel cell 54 produces a voltage differential between anode 60 and cathode 65, and electrochemical reactions of fuel cell 55 produce a voltage differential between anode 61 and cathode 66. The interconnect 51 comprises a low resistance material, such as platinum and/or lanthanum chromite, and thus forms a low resistance electrical connection between cathode 65 and anode 61, and thus the cathode 66 is maintained at a voltage that is about equal to the voltage of cathode 65 plus the voltage differential between anode 61 and cathode 66. Connecting additional fuel cell units with series connections can add voltage gains. In certain embodiments, planar stacks including 15-20 fuel cell units can produce total voltage differentials of greater than 15 volts. In others, the planar stacks produce more than about 3 volts, more than about 5 volts, or more than about 10 volts . These exemplary voltages apply to the other fuel cell stacks described herein. Thus, planar stacking as described herein can provide relatively high voltages in small volumes. The higher voltages within portable housings are beneficial at least in part because many commercial applications for the portable fuel cell assemblies described herein, such as cell phones or laptop computers, require the higher voltages.

As mentioned, during operation the electrochemical reactions of fuel cell units 54-57 produce a voltage differential between anode 60 and cathode 65, and electrochemical reactions of fuel cell 55 produce a voltage differential between anode 61 and cathode 66. However, the voltage differentials are generally produced within active areas of the fuel cell units 54-57 wherein cathodes 65-68 and corresponding anodes 60-63 directly overlie each other. By way of example, the active area 54a of fuel cell unit 54 is shown. The active area 54a is generally constrained to be the region 54a wherein cathode 65 and anode 60 have overlapping projections on the upper surface of the electrolyte layer 48. Fuel cell units 55-57 similarly have active areas 55a, 56a, and 57a. As shown, gaps between adjacent electrodes (i.e., gaps between adjacent cathodes 65-58 and between adjacent anodes 60-63), and the interconnects 51-53 reduce the active areas 54a, 55a, 56a, and 57a. In one feature, the devices and methods discussed below increase the active areas of fuel cell assemblies by reducing these gaps and by reducing the area of the interconnects 51-53.

Figure 2B:
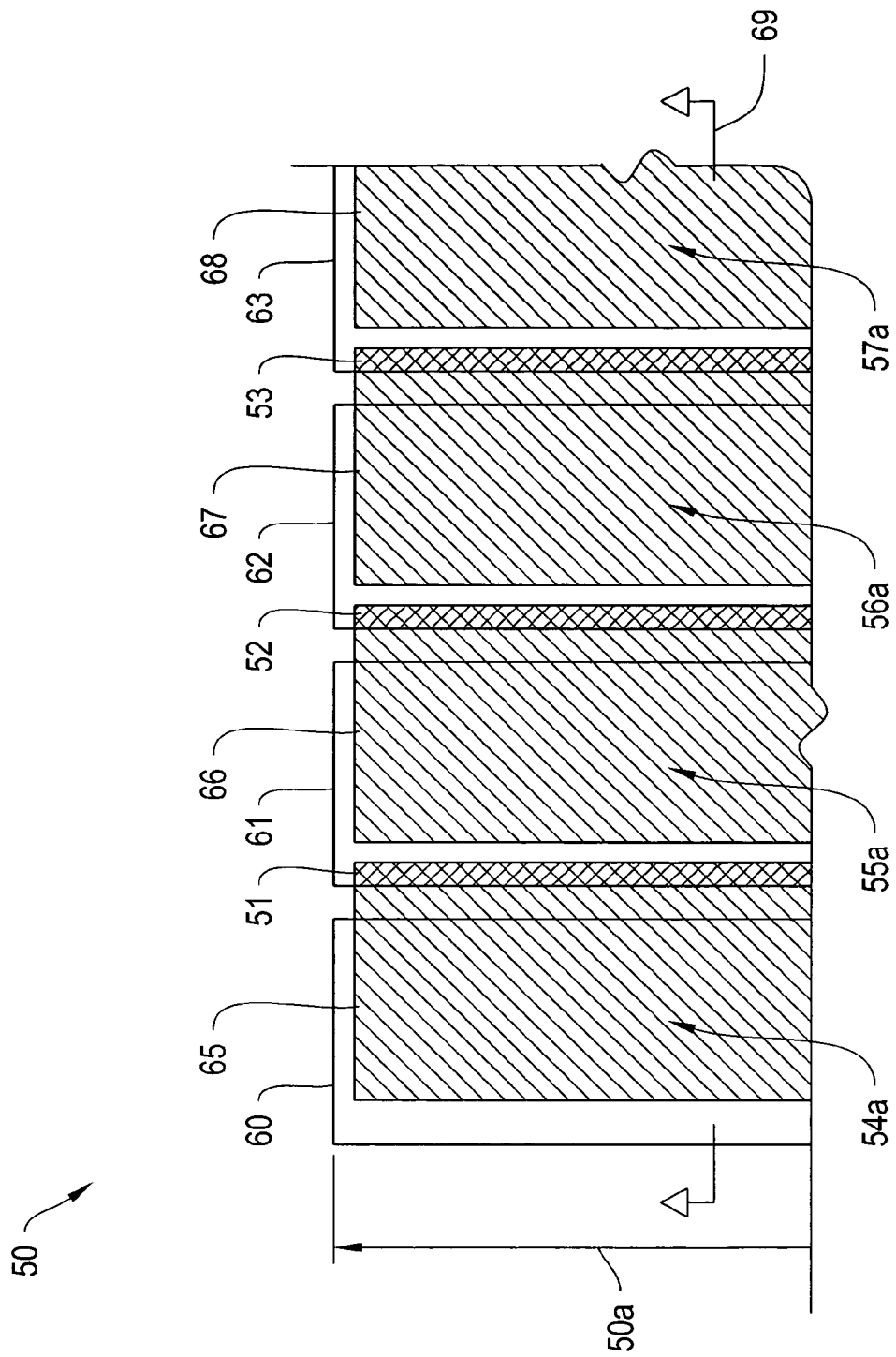
FIG. 2B shows a top view of the stack of FIG. 2A.

FIG. 2B shows a top view of the stack 50 of FIG. 2A. In the depicted configuration, the cathodes 65-68 are offset from the anodes 60-63; however, this need not be the case. Additionally, cross-section 69 depicts the cross-sectional view of FIG. 2A with respect to FIG. 2B. As shown, the interconnects 51-53 comprise long rows/trenches of interconnect material that extend a length 50a of the stack 50. This results in long planar interfaces between the interconnects 51-53 and other fuel cell components, including electrolyte layer 48, cathodes 65-68, and anodes 60-63. Alternative interconnect configurations that avoid long planar interfaces will be discussed below.

Figure 3A:
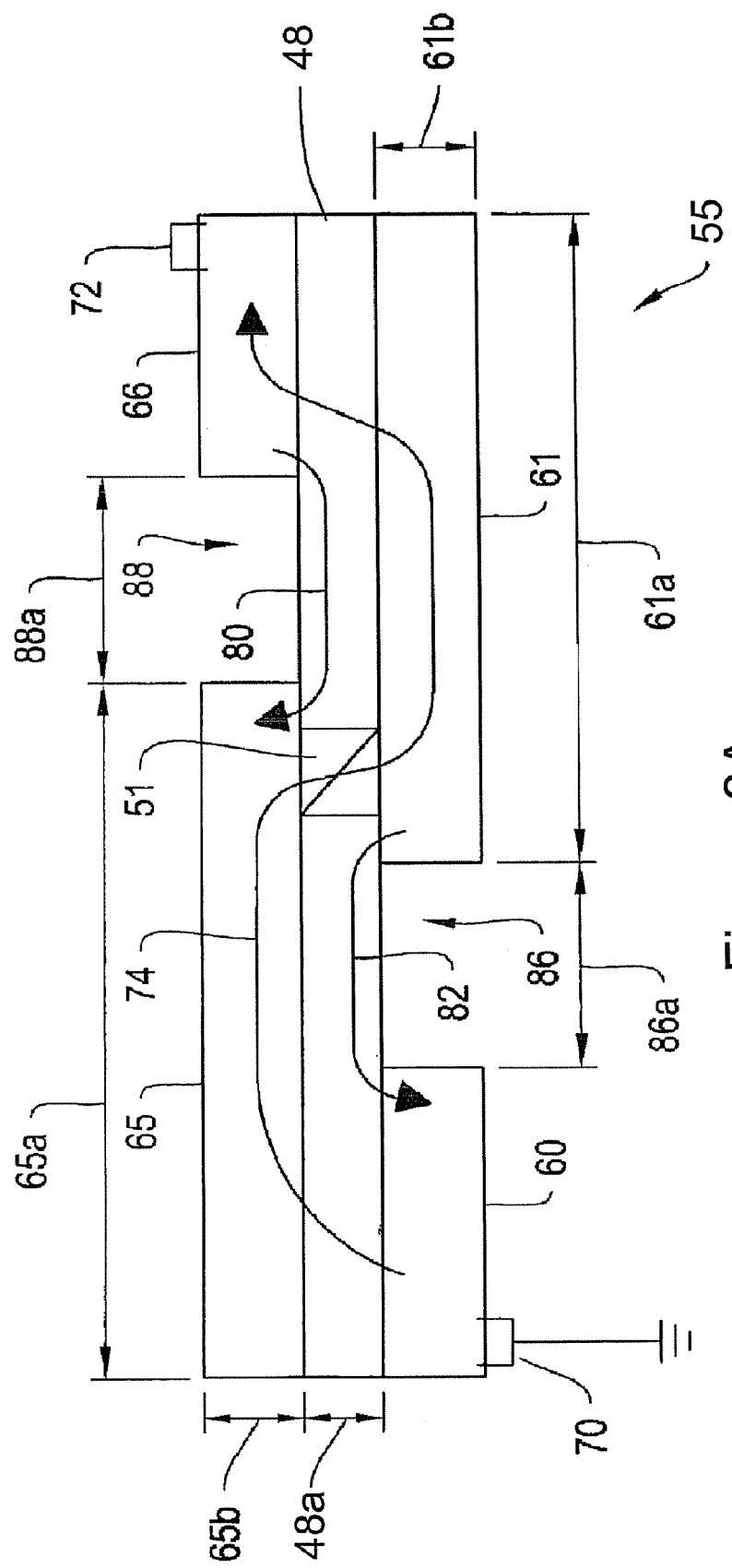
FIG. 3A shows a close-up view of the planar fuel cell stack of FIG. 2 according to an illustrative embodiment of the invention.

FIG. 3A shows a close-up view of the planar fuel cell stack 50 of FIG. 2A according to an illustrative embodiment of the invention. In particular, FIG. 3A depicts the cathodes 65-66, the anodes 60-61, the interconnect 51, and the electrolyte membrane 48. FIG. 3A further includes an anode electrical connector 70 and a cathode electrical connector 72. In this figure, the anode electrical connector 70 couples to electrical ground. As mentioned, during operation the fuel cell unit 54 produces a first voltage differential, the fuel cell unit 55 produces a second voltage differential, and the electrical connector 72 is maintained at a voltage about equal to the magnitude of the first voltage differential added to the second voltage differential. These voltage differentials are associated with internal currents, depicted by the exemplary current path 74, that flow from anode 60 to cathode 65, through the interconnect 51, and from anode 61 to cathode 66.

However, in some cases the voltage maintained at electrical connector 72 may be less than the sum of the two voltage differentials, in part because of internal resistances of the stack 50 and in part because of leakage and/or parasitic currents that oppose the current flow along path 74. These resistances, leakage currents, and parasitic currents can be reduced by adjusting and/or optimizing the dimensions, configurations, and fabrication materials of the various components of stack 50. However, these adjustments may reduce the active area of the fuel cell stack 50, resulting in a set of design tradeoffs that can be balanced in order to increase the efficiency of the fuel cell stack.

For example, one source of internal resistance is the anodes 60-61 and cathodes 65-66. This internal resistance can be lowered by reducing the lateral widths 65a and 61a of the cathodes and anodes. However, reducing the lateral widths 65a and 61a lowers the active area of the fuel cell stack 50. Alternatively, the internal resistance of the stack 50 can be lowered by increasing the thicknesses 65b and 61b of the cathode 65 and the anode 61, respectively. In certain embodiments, this invention reduces internal resistances using a combination of the above-mentioned approaches. In particular, Table 1 shows electrode thicknesses 65b and 61b that correspond to different lateral widths 65a and 61a chosen to achieve relatively low internal resistances. Units and materials are noted in parentheses.

TABLE 1

| Lateral width | Current per fuel cell unit | Lateral electrode resistance (for <0.1 V loss per fuel cell unit) | Allowable sheet resistance (ohms per square) | Thickness of cathode (LSM) (microns) | Thickness of anode (Ni—YSZ) (microns) |
|---|---|---|---|---|---|
| 0.5 mm | 0.06 | 1.667 | 33.33 | 2.1 | 0.6 |
| 1 mm | 0.12 | 0.833 | 8.33 | 8.4 | 2.4 |
| 2 mm | 0.24 | 0.417 | 2.08 | 33.6 | 9.6 |
| 3 mm | 0.36 | 0.278 | 0.93 | 75.6 | 21.6 |

In certain embodiments, and in accordance with the results of Table 1, stack 50 is fabricated with lateral widths 65a and 61a of less than about 2 mm and with electrode thicknesses 65b and 61b of less than about 50 microns. However, in other embodiments, the lateral widths 65a and 61a can be between about 5 microns and about 500 microns. In certain configurations, the lateral widths 65a and 61a are between about 500 microns and about 2 mm.

Another configuration that reduces the resistance of the anodes 60-61 and the cathodes 65-66 includes current collecting films. In this configurations, a material (not shown) with a high conductivity, such as platinum, is disposed as one or more films under the anodes 60-61 (i.e., on the surface of the anodes 60-61 facing away from electrolyte 48) and over the cathodes 65-66 (i.e., on the surface of the cathodes 65-66 facing away from the electrolyte 48). In certain embodiments, the electrode thicknesses 65b and 61b are relatively thin (i.e., less than about 25 microns) and the platinum films are also relatively thin (i.e., less than about 25 microns) so that the laminates of the cathodes 65-66 and platinum films and the laminates of the anodes 60-61 and the platinum films have respective thicknesses of less than about 50 microns. The addition of the high conductivity material reduces the internal resistance. However, in other embodiments, thicker electrode and platinum film layers (i.e., less than about 50 microns each) are used. The platinum films are porous, and thus allow fuel to flow through the platinum films to contact the anodes 60-61 and allow oxygen/air to flow through the platinum films to contact the cathodes 65-66.

As mentioned, in addition to internal resistances, leakage currents can reduce the voltage maintained at electrical connector 72. Leakage currents, depicted by current paths 80 and 82, develop in part from voltage differentials between adjacent cathodes 66 and 65, and adjacent anodes 61 and 60. The leakage currents 80 and 82 must bridge respective electrode gaps 86 and 88. By increasing the lengths 86a and 88a of the gaps 86 and 86 between adjacent cathodes 65 and 66 and adjacent anodes 60 and 61, these leakage currents can be reduced and/or eliminated. In certain embodiments, the lengths 86a and 88a are more than about five times greater than the thickness 48a of the electrolyte membrane 48, and in other embodiments the lengths 86a and 88a are about fifty times greater than the thickness 48a of the electrolyte membrane 48 in order to reduce and/or eliminate the leakage currents 80 and 82.

However, as noted above, increasing the lengths 86a and 88a of the gaps 86 and 88 will reduce the active area of the fuel cell stack 50. Thus, in one aspect, the thickness 48a of the electrolyte membrane 48 is chosen to be relatively small. This allows the lengths 86a and 88a of the gaps to be several times the thickness 48a of the electrolyte membrane layer 48, while still being small enough to preserve the active area of the stack 50. More particularly, in certain embodiments, the thickness 48a of the electrolyte membrane 48 is less than about 40 microns, and in others the thickness is less than about 10 microns or less than about 5 microns. Accordingly, the lengths 86a and 88a of the gaps 86 and 88 are, in certain embodiments, less than about 500 microns, less than about 100 microns, or less than about 25 microns. With these dimensions, the active area of the stack 50 can be greater than about 50%, and in certain configurations is greater than about 70%, or greater than about 85%. With these relatively small thicknesses, the electrolyte membrane layer 48 may not provide adequate structural support to electrodes and/or may unable to withstand thermal stresses of thermal cycling. Therefore, in certain embodiments, the electrolyte membrane layer 48 is provided with structural support members that will be discussed in more detail below.

In addition to leakage currents 80 and 82, parasitic currents can reduce the efficiency of the stack 50. Generally, fuel cell units operate by transferring ions between the anode and cathode of that fuel cell unit through the electrolyte 48 (i.e., negatively charged oxygen ions are transferred through the electrolyte 48 from cathode 65 to anode 60, and from cathode 66 to anode 61) in regions where the anode and the cathode overlap. However, in the depicted stack 50, in certain regions anodes and cathodes of adjacent fuel cells overlap as well. For example, cathode 65 overlaps with anode 61 generally near the region of the interconnect 51 and ions may transfer through the electrolyte in this region as well (i.e., negatively charged oxygen ions may transfer from cathode 65 to anode 61). Since the cathode 65 is electrically connected to anode 61 by interconnect 51, negatively charged electrons can conduct back through the interconnect 51 from anode 61 to cathode 65. The result is a parasitic current loop that consumes fuel but does not produce useful electricity for the load powered by the fuel cell stack 50.

In certain embodiments, this parasitic current is reduced/eliminated by placing a barrier material that does not conduct ions between the electrolyte 48 and one or both of the electrodes 65 and 61 in the region where the electrodes 65 and 61 overlap. The barrier material can comprise one or more of platinum, metal, and a ceramic material. The barrier can be deposited as a film using any one or more of the deposition techniques discussed elsewhere herein.

Alternatively, or in addition, to the above-described technique, the parasitic currents may be reduced/eliminated by altering or replacing the materials of the stack 50 in the region where the cathode 65 and the anode 61 overlap with material that yields little or no voltage differential when in contact with the fuel or oxygen. For example, a manufacturer may alter or replace the material of the cathode 65 and/or the anode 61 so that they comprise less catalytic materials. Additionally or alternatively, the manufacturer may avoid disposing catalyst material between the cathode 65 and the electrolyte 48, or between the anode 61 and the electrolyte 48. In certain embodiments, the materials are chosen such that the stack 50 has a power density in the region where cathode 65 and anode 60 overlap of more than about 10 times the power density in the region where cathode 65 and anode 61 overlap.

Figure 3B:
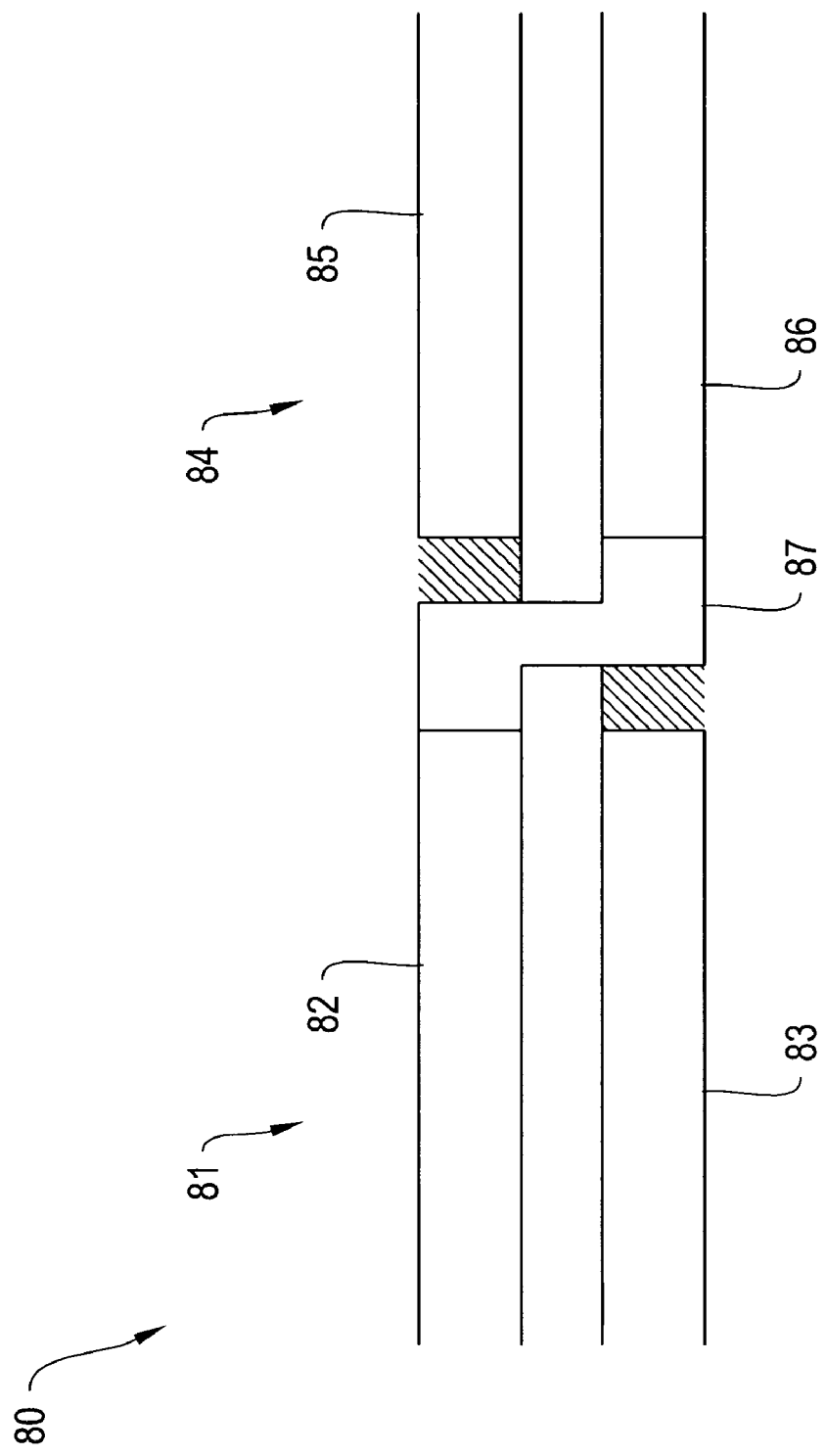
FIG. 3B shows an alternative planar stack configuration in which electrodes in adjacent fuel cell units do not overlap.

In other embodiments, the parasitic current is reduced/eliminated by configuring the stack 50 such that electrodes in adjacent fuel cell units do not overlap. FIG. 3B depicts such a stack 80. The stack 80 includes a first fuel cell unit 81 having a cathode 82 and an anode 83, and a second fuel cell unit 84 having a cathode 85 and an anode 86. An interconnect 87 spans from and electrically connects the cathode 82 to the anode 86. As depicted, the cathode 82 does not overlap with the anode 86, and thus there will be little/no parasitic current through interconnect 87. Another method for reducing parasitic currents that makes use of structural supports will be described below.

Figure 4:
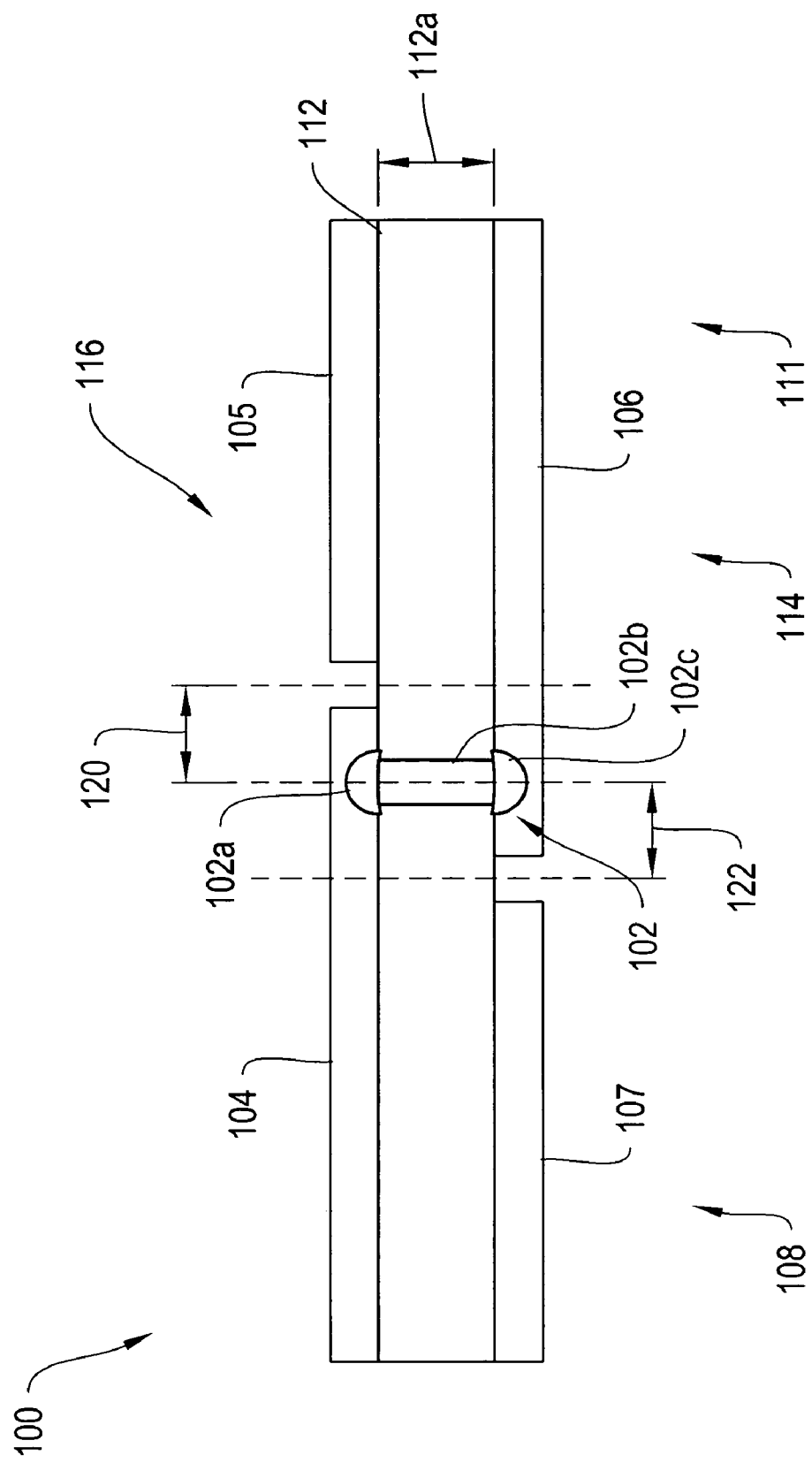
FIG. 4 shows a cross-sectional view of a planar stack having alternative interconnects for connecting an electrode of one fuel cell unit to an electrode of an adjacent fuel cell unit in a planar stack, according to an illustrative embodiment of the invention.
Figure 5:
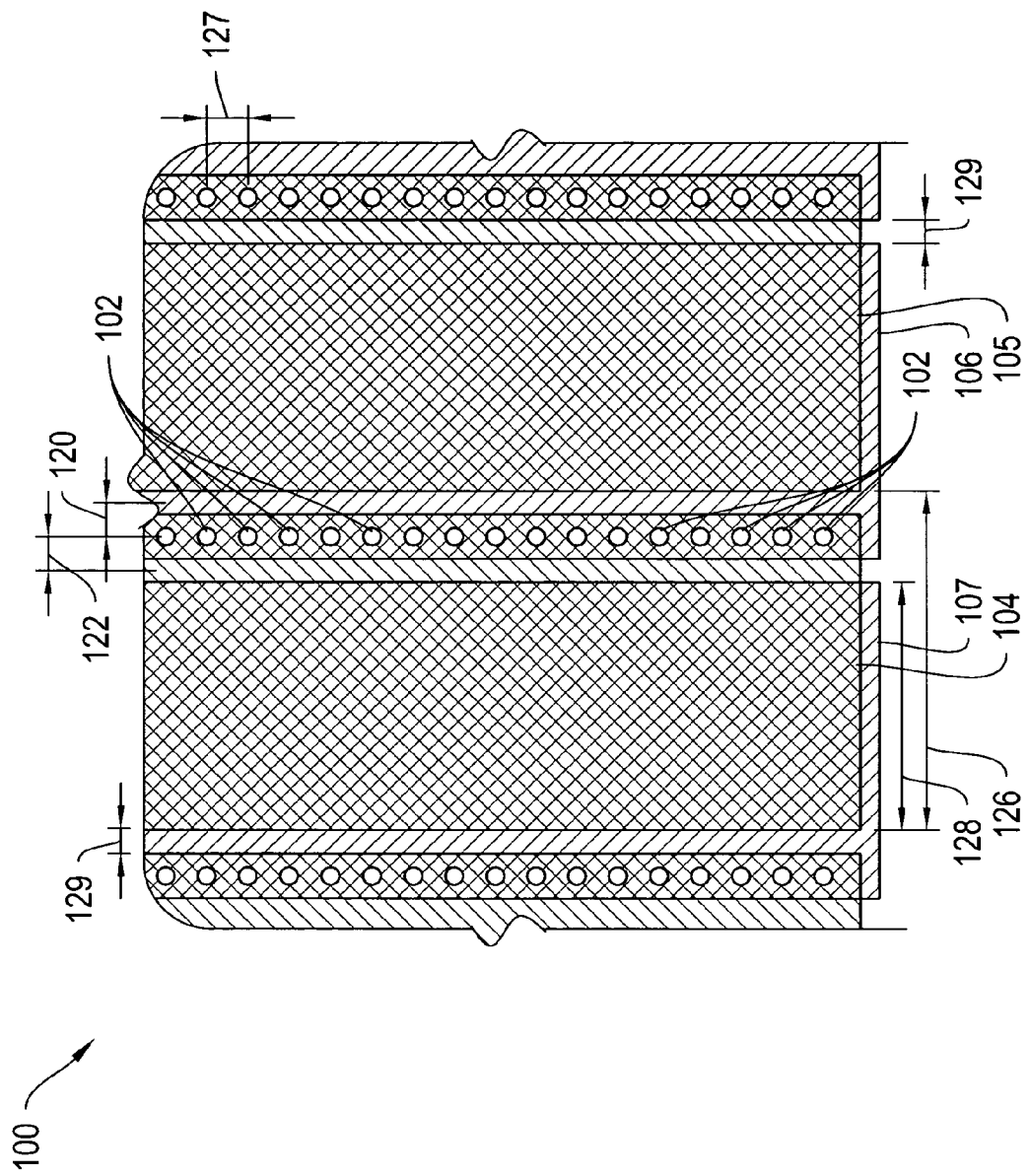
FIG. 5 shows a top view of the planar fuel cell stack of FIG. 4.

FIG. 4 shows a cross-sectional view of a planar stack 100 that includes alternative interconnects 102 for connecting a cathode 104 of one fuel cell unit 108 to an anode 106 of another fuel cell unit 111, and FIG. 5 shows a top view of the planar stack 100 according to an illustrative embodiment of the invention. The interconnects 102 are partially disposed within electrolyte layer 112 and include a top cap 102a that electrically couples to the cathode 104, a bottom cap 102c that electrically couples to the anode 106, and a shaft 102b that is disposed within the electrolyte membrane layer 112.

As illustrated in FIG. 5, in this embodiment a plurality of interconnects 102 electrically couple cathode 104 to anode 106. The interconnects 102 comprise a linear array of interconnects 102. As depicted, the center-to-center spacings 127 of the interconnects are substantially equal. The spacing 127 between vias along a row can be less than about 500 microns, and greater than about 160 microns. More particularly, the interconnects 102 are deposited in holes/vias disposed in a monolithic electrolyte membrane layer 112 (not shown in FIG. 5). The vias are filled with the interconnect material which, as mentioned above, can comprise any low resistance material. The vias have circular cross-sections lying in a plane extending through the electrolyte membrane layer 112. In certain embodiments, the areas of the circular cross-sections are less than about $(100\ \text{microns})^2$. The circular cross-section is beneficial at least in part because it does not include long linear/planar interfaces between the interconnect 102 and the electrolyte 112. Such an interface can stress or crack under high temperatures or thermal cycling. In certain embodiments, the circular cross-sections have diameters that are about 40 microns in diameter, or less than about 20 microns in diameter. These relatively small diameters preserve the active area of the stack 100.

In certain embodiments, the interconnect material seals the cathode side 116 of the stack 100 from the anode side 114 of the stack 100. The seal prevents hydrogen from diffusing from region 114 near the anode 106 to region 116 near the cathode 104, and similarly prevents air and/or oxygen from diffusing from region 116 to region 114. When gas diffuses through membrane layer 112, the stack 100 may lose efficiency. To form a tighter seal, the manufacturer chooses an interconnect material that has a higher coefficient of thermal expansion than that of the electrolyte layer 112. As a result, the interconnect 102 expands relative to the electrolyte layer 112 when the stack 100 heats to its operating temperature, and thereby forms a tight seal at the interface of the electrolyte layer 112 and the interconnect 102.

In addition, the interconnects 102 include a top cap 102a and a bottom cap 102c. which improves the seal between regions 114 and 116. In certain embodiments, the shaft 102b has a circular cross-section with diameter of about 40 microns, while the top cap 102a and the bottom cap 102b have circular cross-sections at their respective interfaces with the shaft 102b having diameters of about 80 microns.

The distance 120 between the center of the interconnect 102 and the center of the gap between adjacent cathodes 104 and 105 is known as the cathode standoff 120, and the distance 122 between adjacent anodes 106 and 107 is known as the anode standoff 122. In certain embodiments, both the anode standoff 122 and the cathode standoff 120 are less than about 100 microns, less than about 95 microns, or less than about 70 microns.

Table 2 describes the active area obtained in one illustrative embodiment of the invention. In this illustrative embodiment, the distance between corresponding components in adjacent fuel cell units, known as the repeat distance 126, is 2.25 mm, although in other embodiments the repeat distance 126 is between about 1 mm and about 4 mm. The active area in this illustrative embodiment is about 89%, though higher active areas are possible using techniques described above. For example, a manufacturer can increase the active area without significantly compromising voltage gain by using a thinner electrolyte layer 112 and reducing the length of the gap 129 between adjacent cathodes and/or adjacent anodes.

TABLE 2

| | |
|---|---|
| Electrolyte thickness 112a | 5 microns |
| Top cap and bottom cap cross-section diameter | 80 microns |
| Electrode gaps 129 | 60 microns |
| Electrode to interconnect standoffs 120, 122 | 95 microns |
| Repeat distance of cells 126 | 2.25 mm |
| Width of active area 128 | 2.0 mm |
| Active area coverage | 89% |

As mentioned above, fuel cell assemblies in certain embodiments operate at extremely high temperatures, which stresses fuel cell components due to excessive heat and due to thermal cycling. In particular, certain solid oxide fuel cell embodiments of this invention operate at temperatures exceeding 400 degrees, 500 degrees C., 600 degrees C., 700 degrees C., or 800 degrees C. In some cases, the fuel cells operate at temperatures that exceed 1100 degrees C. Fuel cell assemblies that power portable consumer electronics products may turn on and off repeatedly over the lifetime of the product. As a result, the fuel cell thermally cycles repeatedly between ambient temperatures and the high operating temperatures mentioned above. Since the components of fuel cell assemblies can comprise several materials, and since the materials may have varying coefficients of thermal expansion, the thermal cycling can stress fuel cell components at their interfaces with other components. Thus, in certain embodiments, the fuel cell assembly includes additional structural supports.

Figure 6:
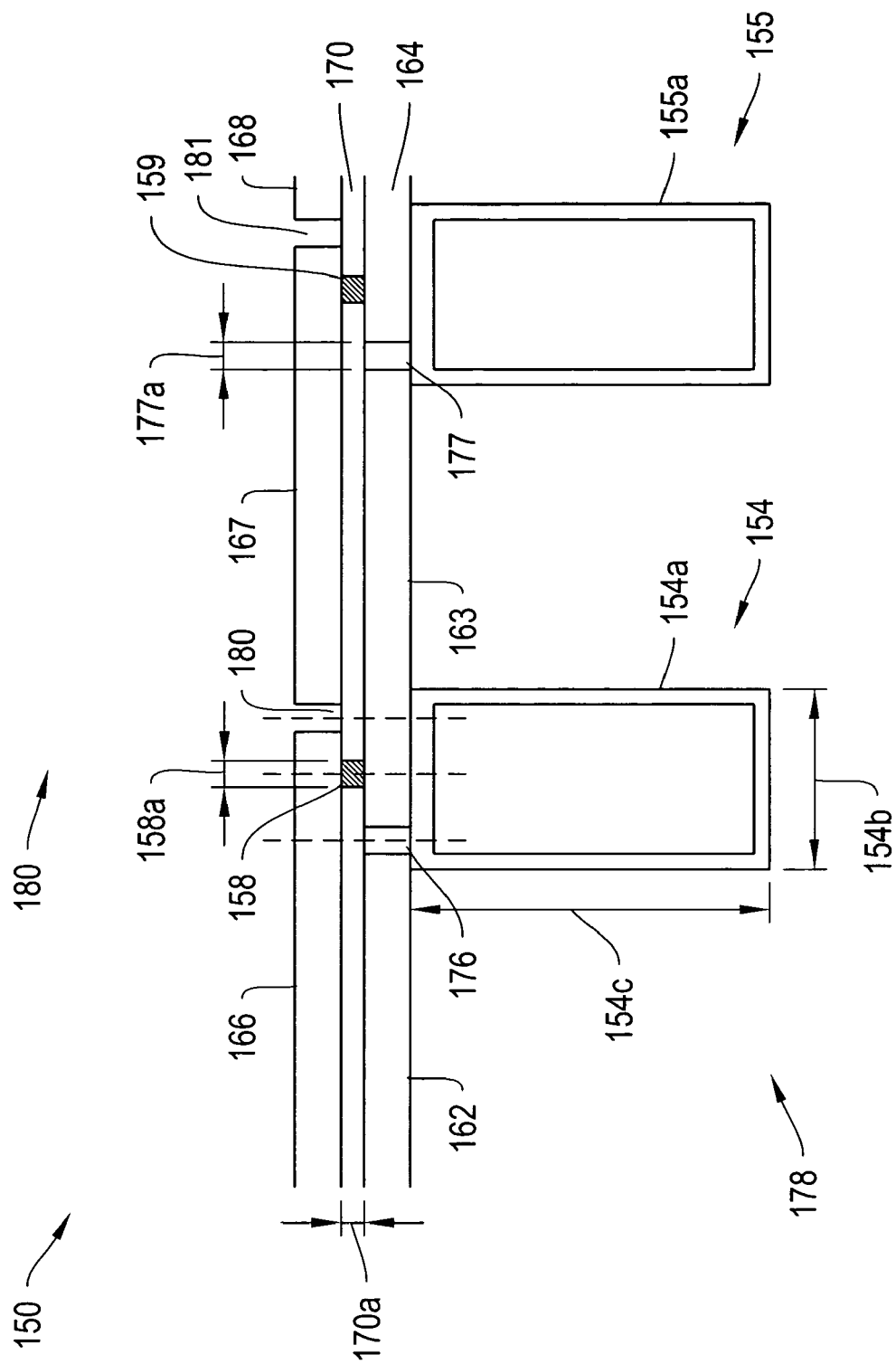
FIG. 6 shows a planar fuel cell stack including structural support members aligned with respective electrode interconnects.

FIG. 6 shows a planar fuel cell stack 150 including structural support members 154 and 155 aligned with respective electrode interconnects 158 and 159 according to an illustrative embodiment of the invention. The structural support members 154 and 155 are shown to be elongate and oriented perpendicular to a plane extending through the stack 150. The interconnects 158 and 159 are similar to the interconnects 51-53 of FIG. 2. The structural support member 154 includes a coating 154a, and mechanically couples to anodes 162 and 163. Similarly, structural support member 155 includes a coating 155a and mechanically couples to anodes 163 and 164. The structural support members 154-155 provide structural support and relieve and/or absorb stresses caused by, for example, high temperatures and/or thermal cycling. In addition or in the alternative, structural support members similar to supports 154-155 can mechanically couple with one or more of the cathodes 166-168. The depicted structural supports 154 and 155 align with respective electrical interconnects 158 and 159, but more generally, in certain embodiments, at least a portion of the structural supports 154 and 155 align with respective interconnects 158 and 159. Additionally, the depicted structural supports 154 and 155 bridge anode gaps 176 and 177. The anode gaps 176 and 177 and the cathode gaps 180 and 181 include interfaces that may provide pathways through which fuel diffuses from the anode side 178 to the cathode side 180 of the stack 150, which, as mentioned above, can reduce the efficiency of the stack 150. In the depicted position, structural supports 154 and 155 seal the electrode gaps 176 and 177, reducing and/or eliminating the diffusion. In one aspect, this positioning is beneficial because the regions where the anode gaps 176-177, the cathode gaps 180-181, and the interconnects 158 and 159 overlap with the electrolyte membrane 170 correspond to inactive regions of the stack 150. As a result, positioning the structural supports 154-155 to be aligned with these features does not impact the active area of the stack 150.

The positioning is also beneficial to reduce/eliminate parasitic current. As discussed above, parasitic currents occur generally in regions where electrodes of adjacent fuel cell units overlap and react with, for example, fuel and oxygen to transport ions through the electrolyte 170. In the depicted stack 150, the structural support 154 blocks access of fuel to the anode 163 in the region where the anode 163 overlaps with the cathode 166 of the adjacent fuel cell. Thus, fuel does not react with anode 163 in the region that would otherwise give rise to parasitic currents. Additionally, or alternatively, the parasitic currents can be reduced/eliminated by a structural support disposed over cathode 166 over the region where cathode 166 overlaps with anode 163 by preventing oxygen from contacting the cathode 166 in this region.

In certain embodiments, the structural supports 154-155 comprise a material with a similar coefficient of thermal expansion as other devices in the planar stack 150. This reduces stresses from thermal cycling at the interfaces of structural support members 154-155 and other components of the stack 150. For example, if the electrolyte membrane 170 comprises YSZ, then the support structure can comprise zirconia, magnesium oxide, ferritic stainless steel (Fe—Cr), and/or combinations thereof. In other embodiments, the coefficient of thermal expansion of the structural supports is similar to that of anodes 162-163 and/or cathodes 166-168.

In certain embodiments, the structural supports 154-155 comprise electrical insulators to, in part, insulate electrodes that are mechanically coupled by one of the structural support members 154-155, such as cathodes 166 and 167, or anodes 162 and 163. For example, the structural supports 154-155 can comprise a ceramic material including oxides, non-oxides, and/or composites. Exemplary ceramic materials include titanates, oxides, and nitrides. In certain embodiments, the structural supports 154-155 comprise plastic materials.

Certain materials that insulate at room temperature, however, do not insulate at the high operating temperatures mentioned above (e.g., silicon). Thus, the structural supports 154-155 include coatings 154a and 155a. In certain embodiments, the coating comprises a separate material applied to the structural supports 154-155. However, in other embodiments, the coatings 154a and 155a are formed via chemical reactions to surfaces of the structural supports 154. In certain embodiments, the surfaces of the structural supports 154-155 are oxidized to form oxidized coatings 154a and 155a.

In certain embodiments, the structural support 154 has a width 154b of between about 30 microns and about 200 microns, and a height of greater than about 100 microns. In some implementations, the width is between about 10 microns and about 400 microns. In some implementations, the height is between about 300 microns and 500 microns, but can be as large as 1 mm, 2 mm, or 3 mm. The height can also be between about 50 microns and 100 microns.

In certain embodiments, the structural supports 154-155 support the stack 150 so that electrolyte layers 170 can have a thickness of less than about 2 microns or less than about 1 micron while still withstg thermal stress.

Figure 7:
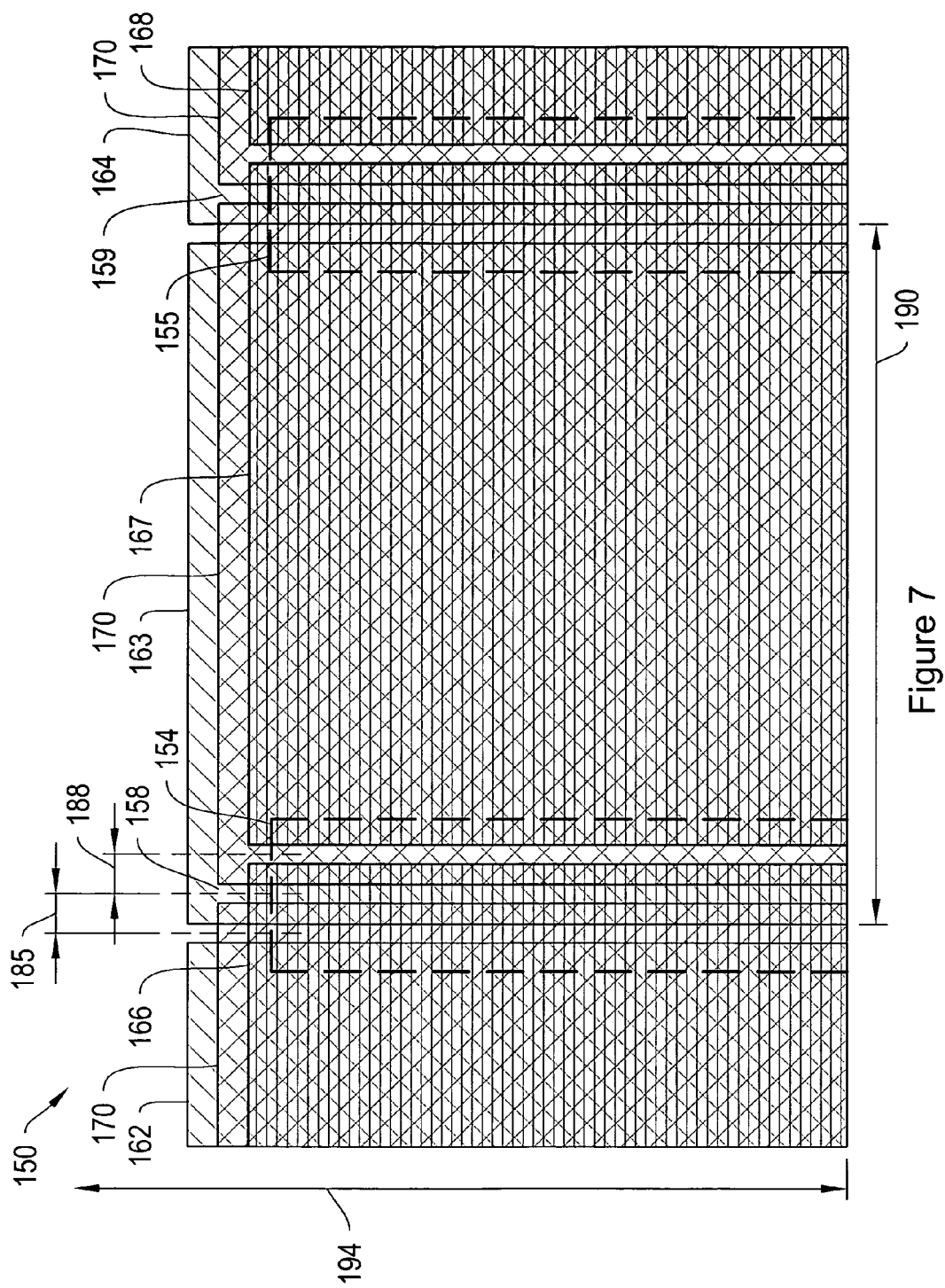
FIG. 7 shows a top view of the planar fuel cell stack of FIG. 6 according to an illustrative embodiment of the invention.

FIG. 7 shows top view of the planar fuel cell stack 150 of FIG. 6. The depicted structural supports 154-155 extend substantially the entire length of the stack 150 along axis 194, however, in other embodiments the structural supports 154-155 extend only a portion of the length of the stack 150 along the axis 194. In addition, FIG. 7 shows the anode standoff 185, the cathode standoff 188, and the cell repeat distance 190.

Figure 8:
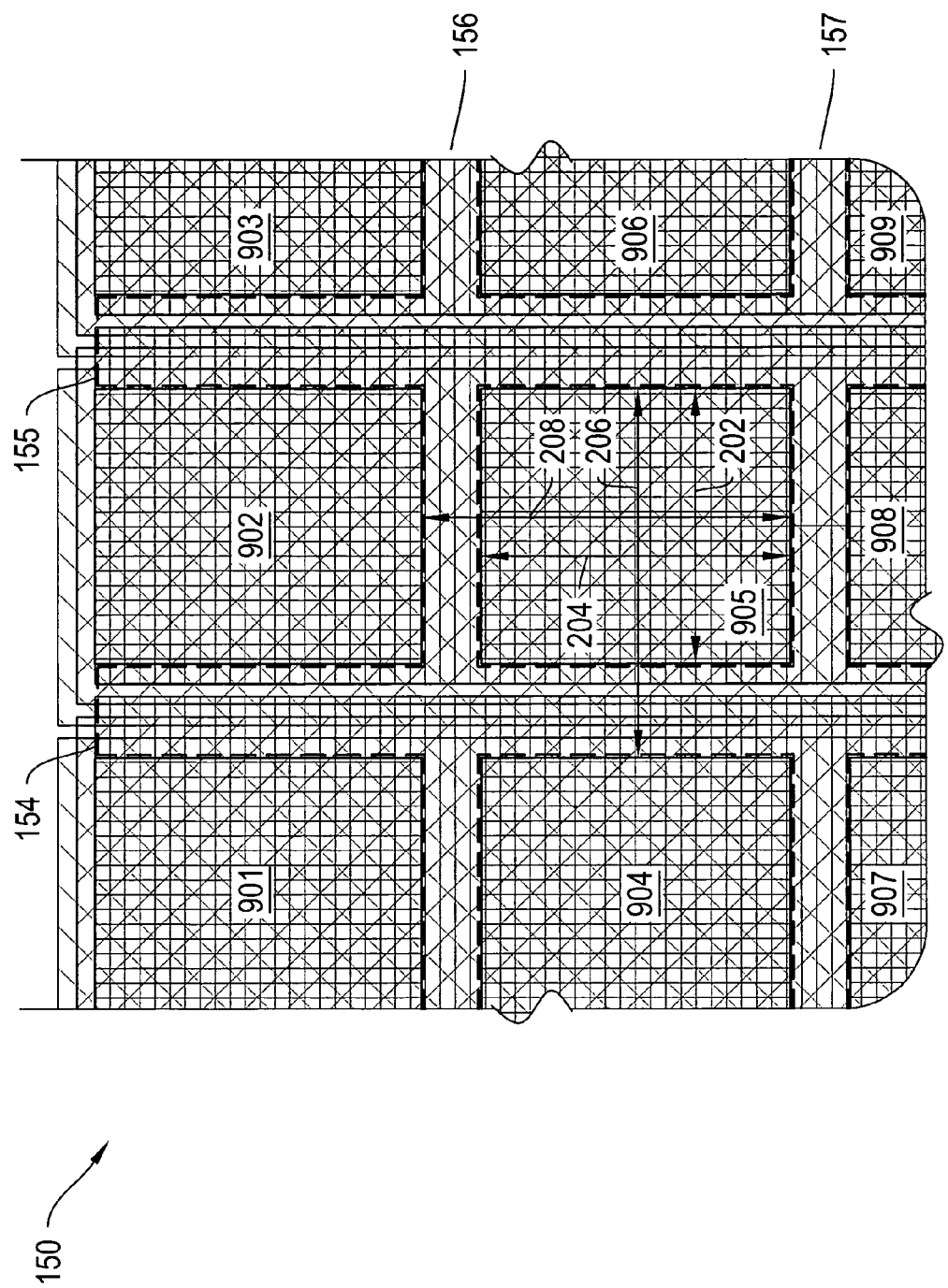
FIG. 8 shows the stack of FIG. 7 with additional structural supports.

FIG. 8 shows the stack 150 of FIG. 7 along with additional structural supports 156-157 also disposed below and mechanically coupled to the anodes of the stack 150. The structural supports 154-157 comprise a grid of structural supports 154-157. Although depicted as separate elements, the structural supports 154-157 are, in certain embodiments, formed from a single substrate and comprise a single monolithic structure. Thus, the structural supports define nine distinct fuel cell units 901, 902, 903, 904, 905, 906, 907, 908, and 909. FIG. 8 depicts an exemplary active area region of fuel cell unit 905 spanned by distance 202 in one direction and distance 204 in another direction. FIG. 8 also depicts an exemplary total area region of fuel cell unit 905 spanned by the distance 206 in one direction and distance 208 in another direction. The active area divided by the total area represents the active area percentage. Table 3 gives two examples of two different stacking design parameters and performance results.

TABLE 3

| | | |
|---|---|---|
| Electrolyte thickness 170a | 2 microns | 2 microns |
| Width of interconnect 170a | 10 microns | 10 microns |
| Electrode gaps 177a | 80 microns | 20 microns |
| Cathode standoff 188 and anode standoff 185 | 65 microns | 25 microns |
| Width of support structure 154b | 250 microns | 125 microns |
| Single cell active area | 1.25 × 1.35 mm 1.56 mm$^2$ | 1.35 × 1.35 mm 1.82 mm$^2$ |
| Repeat distance 190 | 1.5 × 1.5 mm | 1.5 × 1.5 mm |
| Active fuel cell area percentage | 69% | 84% |

Figure 9:
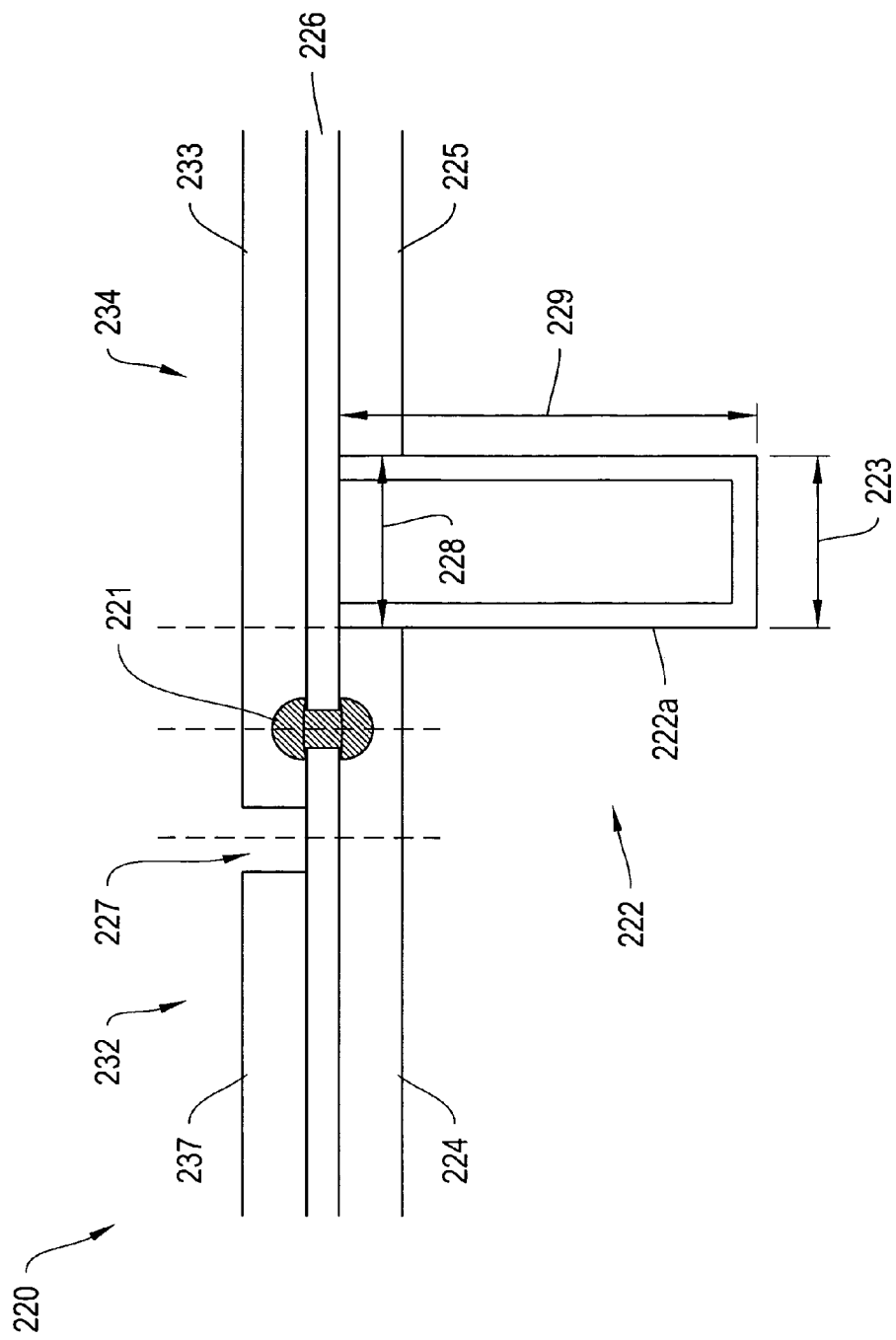
FIG. 9 shows an alternative configuration of structural supports according to an illustrative embodiment of the invention.

FIG. 9 shows an alternate configuration of structural supports. In particular, FIG. 9 shows a planar fuel cell stack 220 including two fuel cell units 232 and 234 and a structural support member 222 partially disposed laterally between adjacent anodes 224 and 225 according to an illustrative embodiment of the invention, and includes interconnects 221 similar to the interconnect 102 of FIG. 4. The structural support member 222 mechanically couples to the electrolyte membrane 226, is elongate, and is oriented perpendicular to a plane extending through the stack 220 and the electrolyte 226. In one aspect, this positioning is beneficial because the gap 228 between adjacent anodes 224 and 225 corresponds to an inactive region of the fuel cell, and as a result disposing the structural support 222 within the gap 228 does not impact the active area of the stack 220. Additionally, in this embodiment the structural support 222 can directly bond to the electrolyte 226 using, for example, an adhesive bond. The bond can be tight at least in part because the electrolyte 226 is a dense structure. The structural support 222 is otherwise similar to the structural supports 154-155 of FIG. 6. In particular the structural support 222 may include a coating 222a, and may have a width 223 of less than about 80 microns, less than about 40 microns, or less than about 20 microns. As discussed above, the structural support member 222 can comprise a material with a substantially similar coefficient of thermal expansion as that of the electrolyte 226 to reduce stress due to thermal expansion at the interface between the structural support 222 and the electrolyte 226. However, in certain embodiments the structural support 222 comprises a material with a coefficient of thermal expansion that differs from that of the electrolyte 226 and still adequately supports the stack 220. For example, in certain embodiments, the structural support 222 comprises silicon while the electrolyte 226 comprises YSZ.

Figure 10:
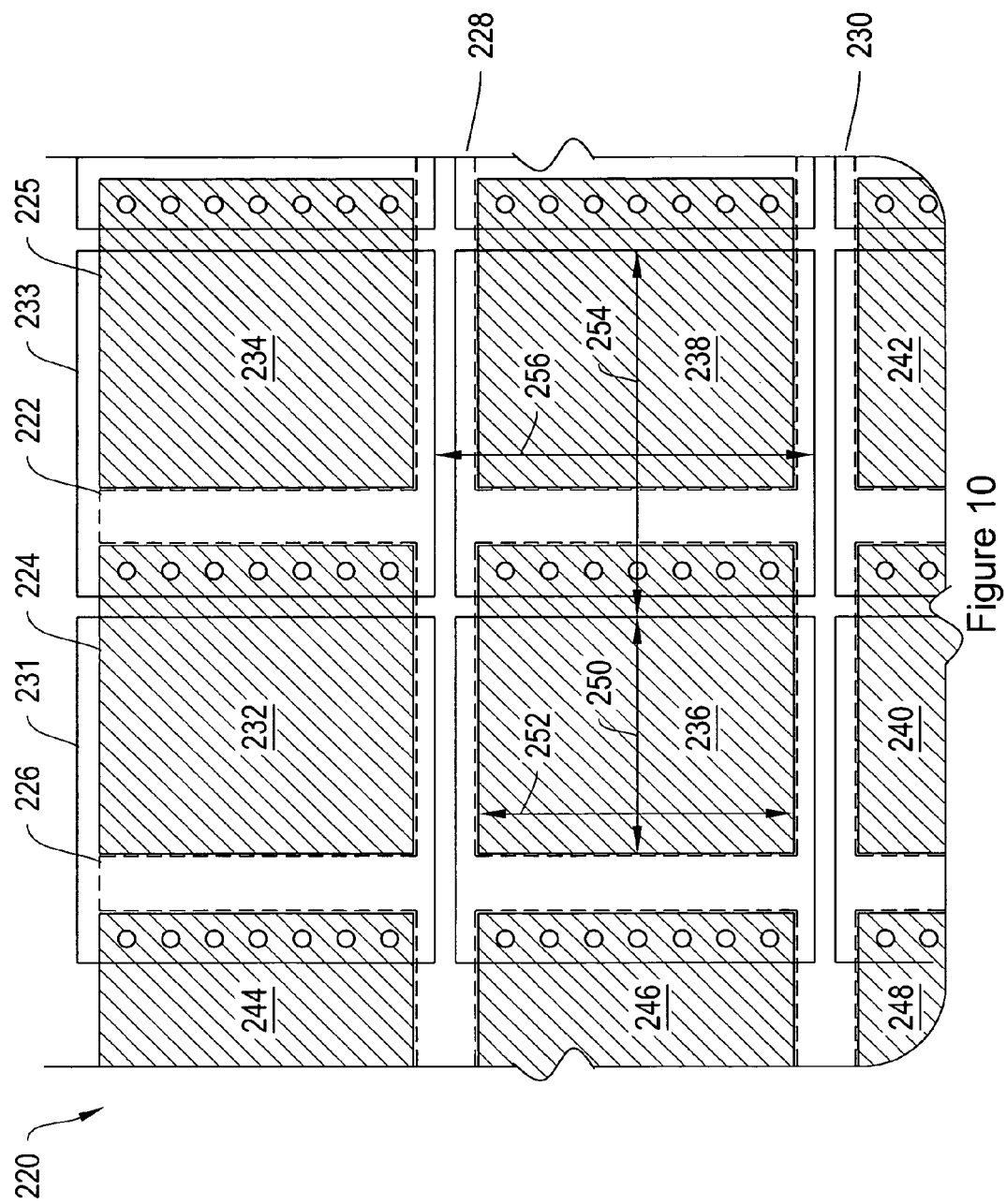
FIG. 10 shows a top view of the planar fuel cell stack according to an illustrative embodiment of the invention.

FIG. 10 shows a top view of the planar fuel cell stack 220 including structural support 222 according to an illustrative embodiment of the invention. In addition to fuel cell units 232 and 234, the stack 220 includes several other fuel cell units 236, 238, 240, 242, 244, 246, and 248, and in addition to structural support 222, the stack 220 includes structural supports 226, 228, and 230. As discussed with respect to structural supports 154-157 of FIG. 8, the structural supports 222, 226, 228, and 230 comprise a grid of structural supports, and in certain embodiments are formed from a monolithic substrate as will be discussed below. Distances 250 and 252 span an exemplary active are of a single fuel cell unit 236 of the stack 220, and distances 254 and 256 span an exemplary total area of a single fuel cell unit 238 of the stack 220.

Figure 11:
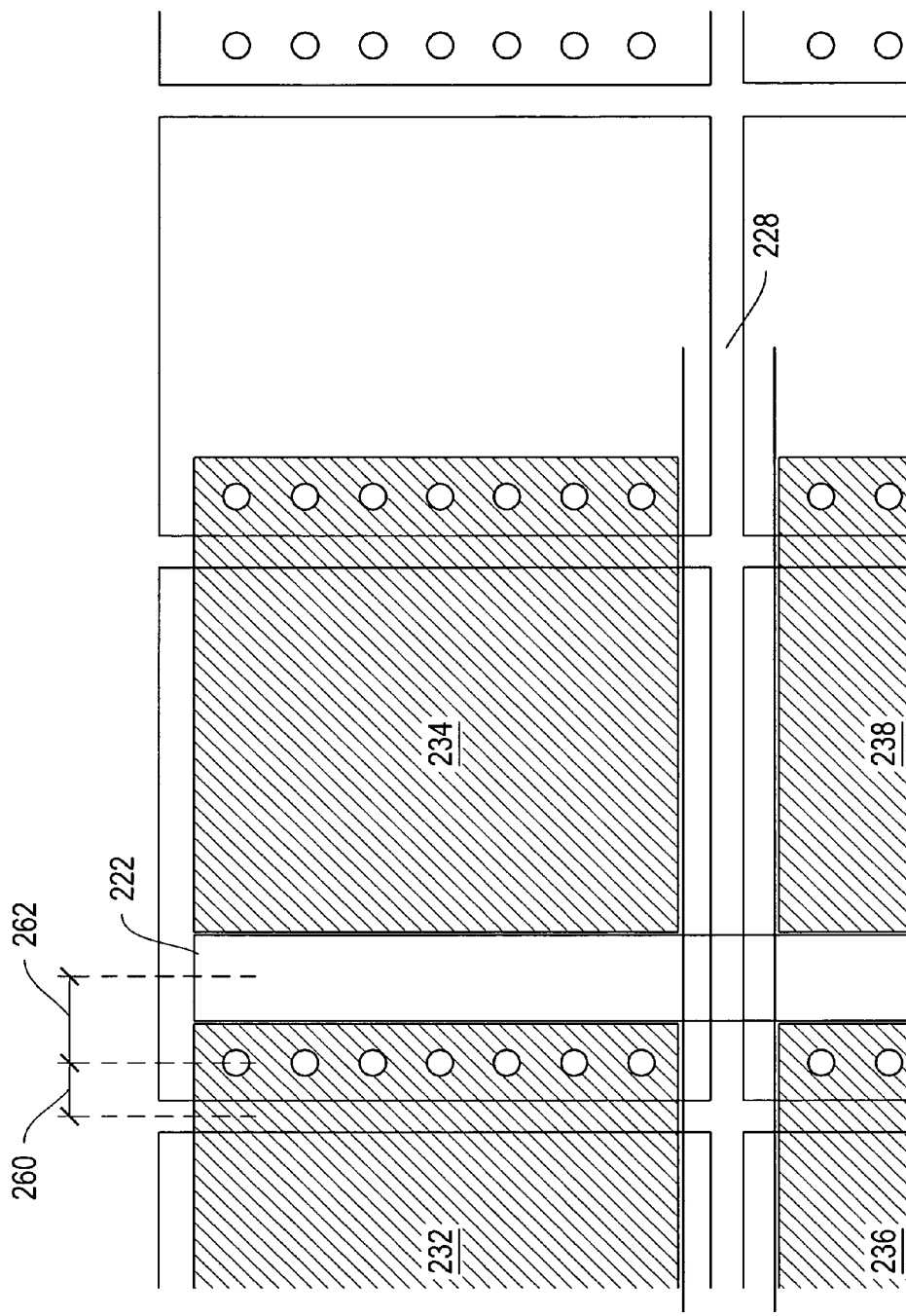
FIG. 11 shows a close-up of the top view of FIG. 10.

FIG. 11 shows a close-up of the top view of the planar fuel cell stack 220 of FIG. 10, and in particular shows the cathode standoff 260 and the anode standoff 262. Table 4 gives several design parameters and performance results for one exemplary implementation of stack 220.

TABLE 4

| | | |
|---|---|---|
| Thickness of electrolyte 226 | 2 microns | 2 microns |
| Diameter of cross-section of interconnect (including caps) | 20 microns | 20 microns |
| Electrode gaps 227 | 80 microns | 20 microns |
| Standoffs 260 and 262 | 65 microns | 30 microns |
| Width of support structure 223 | 80 microns | 40 microns |
| Single cell active area | 0.85 × 1.02 mm 0.87 mm$^2$ | 0.990 × 1.06 mm 1.05 mm$^2$ |
| Repeat distance 254 | 1.1 × 1.1 mm | 1.1 × 1.1 mm |
| Active area percentage | 72% | 87% |

FIGS. 12-15 depict an exemplary technique for fabricating a fuel cell stack similar to stack 220. More particularly, FIGS. 12-15 show exemplary methods employed for patterning and aligning small-dimension features as used in this invention. In general, a manufacturer provides a substrate that will ultimately form structural supports, disposes an electrolyte and patterns the electrolyte with interconnects, selectively removes portions of the substrate to form the structural supports, and then disposes the electrodes on the electrolyte.

Figure 12:
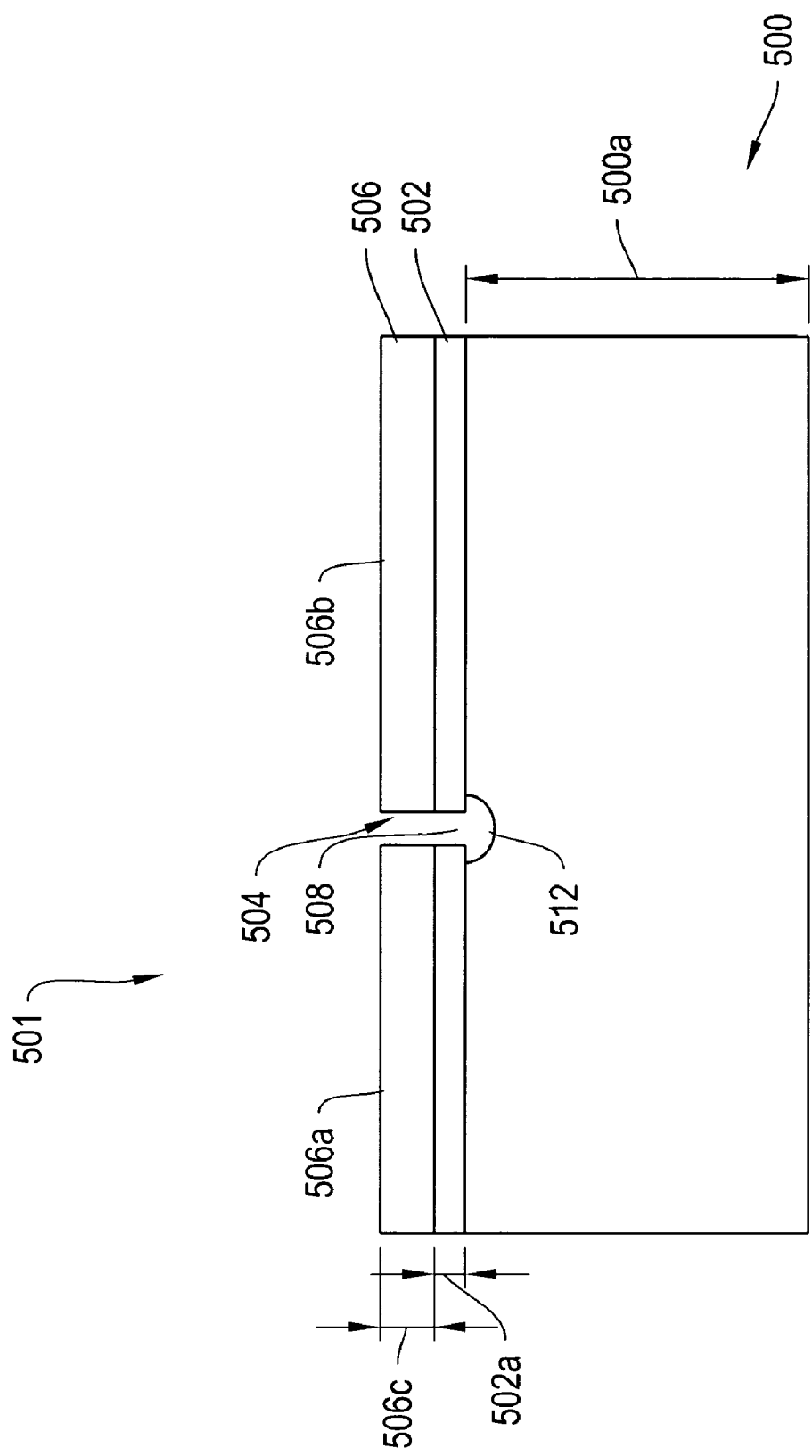
FIG. 12 shows steps in a method of fabricating a planar fuel cell stack including providing a substrate and depositing an electrolyte.

Turning to FIG. 12, a manufacturer first provides a substrate 500 that will form the structural supports similar to structural support 222 of FIG. 9. Next, the manufacturer deposits an electrolyte layer 502 on the substrate 500 using, for example, sputtering, vacuum evaporation, chemical vapor deposition, laser ablation, dip coating, and plasma or vapor spray techniques.

The manufacturer then patterns via holes 504 in the electrolyte layer. In exemplary techniques, the manufacturer flows and/or spreads a positive photoactive photoresist material 506 on the electrolyte 502 and the photoresist 506 cures. The thickness 506c of the photoresist 506 can be between about 1 micron and about 50 microns. The manufacturer exposes the region of the electrolyte overlying via 504 to visible light using a photomask (not shown). The manufacturer then applies a developer solution which removes the photoresist in areas 508 exposed to the light through the photomask. The remaining portions of the photoresist 506a and 506b protect underlying regions of the electrolyte 502 when the manufacturer fabricates via 504.

The manufacturer then etches the via 504. In certain embodiments, the etch comprises ion milling, wherein a stream of argon ions bombard the electrolyte 502. The argon ion stream can comprise a flux greater than about 10 mA/cm2 and an acceleration voltage in excess of 500 volts. The via 504 is then etched at a rate of more than about 40 angstroms per minute. However, in other embodiments, the etch comprises wet etching using a solution of hydrofluoric acid, using a combination of hydrofluoric and hydrochloric acids and plasma etching from a plasma of $CFCl_3$ gas, and/or laser ablation.

Optionally, the manufacturer then forms the cavity 512 that will shape a cap shape of an interconnect. In certain embodiments, the manufacturer exposes the structure 501 to a plasma comprising sulfur hexaflouride for more than about 10 minutes.

Next, the manufacturer electroplates the via 504 and cavity 512 to form an interconnect. More particularly, the manufacturer applies a seed layer of interconnect material. In certain embodiments, the seed layer is applied by exposing the structure 501 to a flux of interconnect material atoms in a vacuum or low pressure environment.

Figure 13:
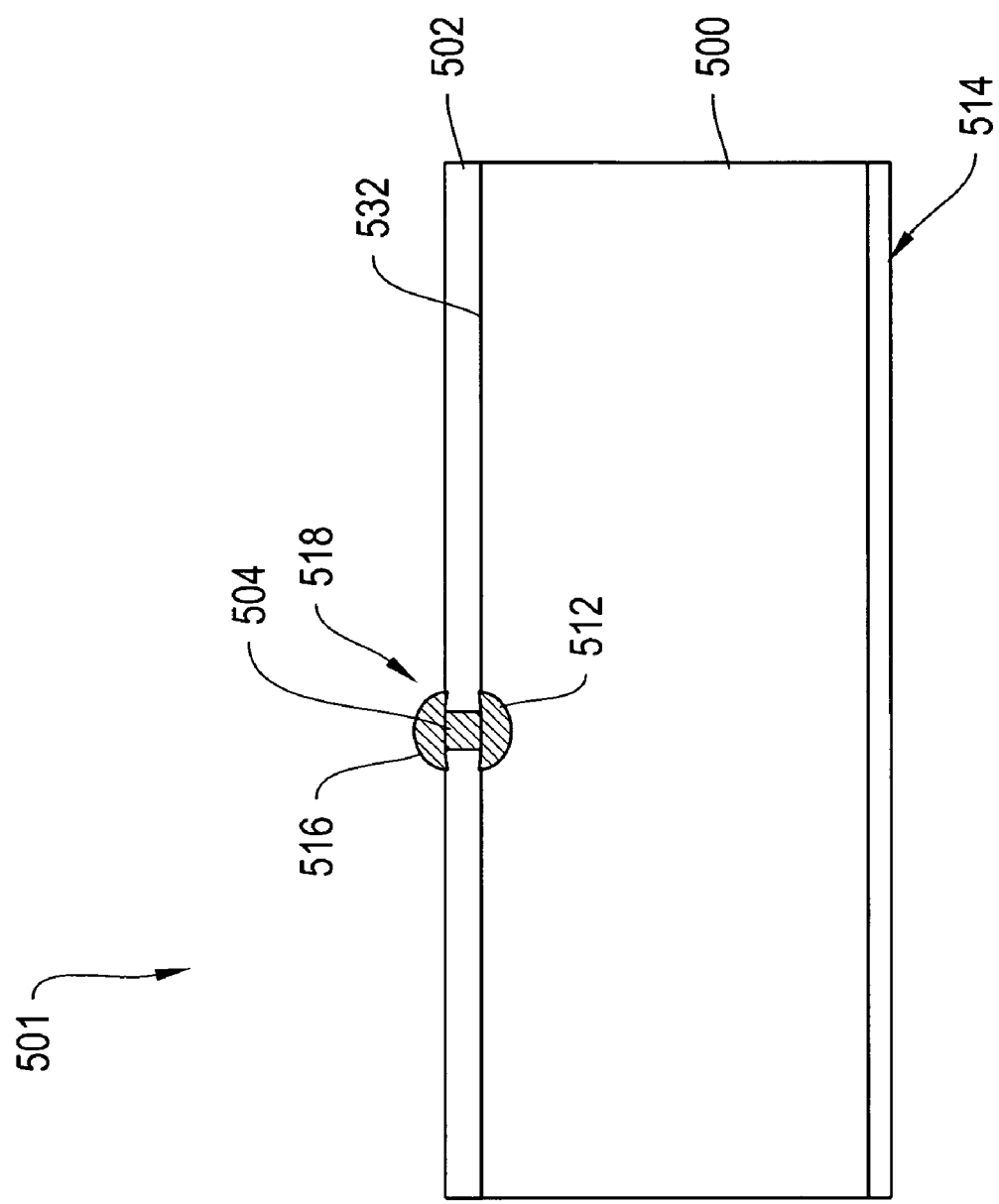
FIG. 13 shows steps in a method of fabricating a planar fuel cell stack including forming interconnects, according to an illustrative embodiment of the invention.

Turning to FIG. 13, the manufacturer then removes the photoresist 506. Interconnect material is disposed in the vicinity 512 of the via hole 504 and on the back side 514 of the substrate 500.

The manufacturer then electroplates the cavity 512 and the via 504. In particular, the manufacturer exposes the structure 501 to a plating solution of chloroplatinic acid or platinum sulfate. The manufacturer provides a wafer chuck which electrically couples to the back side 514 of the silicon wafer. Electroplating currents flow through the silicon substrate 500. The electrolyte 502 insulates the electroplating current from the plating solution except in region 512. Thus, the interconnect material fills the cavity 512 and then fills the via 504. The electroplating currents continue to flow through the substrate 500 until a cap 516 forms, completing the interconnect 518.

Figure 14:
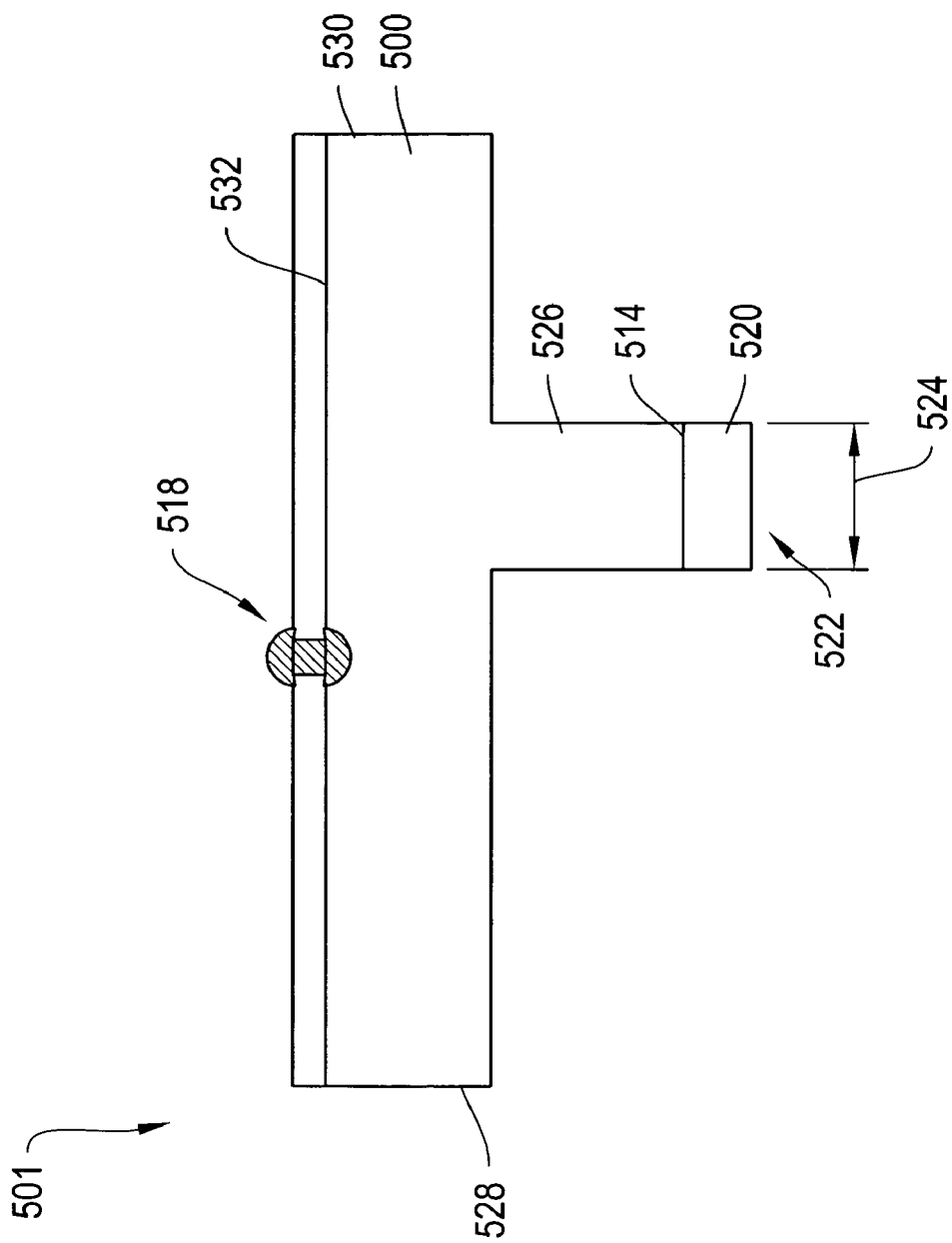
FIG. 14 shows a step in a method of fabricating a planar fuel cell stack including etching a substrate to form structural supports, according to an illustrative embodiment of the invention.

The manufacturer then forms the structural supports from substrate 500 and in particular selectively removes portions of substrate 500 to form structural supports. Turning to FIG. 14, the manufacturer applies and cures a negative photoresist 520 to the back side 514 of the substrate 500. The photoresist 520 is selectively exposed to visible light through a photomask, and then the manufacturer removes portions (not shown) of the photoresist 520 using a developer solution, and etches portions of the substrate 500 not protected by photoresist 520. Subsequent to these steps, a region 522, not exposed to visible light through the photomask, remains. In certain embodiments, the etching comprises an anisotropic dry etch. In particular, a manufacturer places the structure 501 inside a vacuum chamber and alternately fills and excites the chamber with a plasma of sulfur hexaflourise ($SF_6$) and Octafluorocyclobutane ($C_4F_8$). The manufacturer attaches the structure 501 to an electrode with a negative bias in the vacuum chamber, such that positive ions, including sulfur ions such as $S^{6+}$, accelerate at an angle normal to the back side 514 of the substrate 500, thereby enhancing the etch rate of the exposed silicon surface. The plasma of $C_4F_8$ deposits a protective fluorocarbon layer on the side of the silicon walls, and thereby reduces any lateral etch rate and enhances the control over the final width 524 of the structural support 526.

As mentioned above, the active area of fuel cell stacks is impacted by the length of gaps between adjacent electrodes and standoff distances. The electrode gaps and standoff distances discussed above, which were in certain embodiments less than 100 microns, have relatively small dimensions, and it is desirable that the various deposition, patterning, and etching steps described herein align with high precisions. By way of example, if, in FIG. 9, the interconnect 221 misaligns during fabrication and bridges the electrode gap 227, the interconnect 221 will electrically short the cathode gap 227 and eliminate voltage gain between fuel cell units 232 and 234.

Thus, exemplary fabrication techniques align the photomasks with the photoresist 506 and/or the substrate 500 with precisions of less than about 10 microns, less than about 5 microns, or less than about 1 micron. In certain embodiments, the substrate 500 is marked with alignment marks etched or otherwise formed on the surfaces of the substrate 500. By way of example, box-shaped or circular alignment marks can be disposed on the substrate 500 to indicate a target region for the interconnect 518. Photomasks discussed above can also include matching marks which align with corresponding marks on the substrate 500. The substrate 500 can be moved laterally by a photo-alignment assembly with the above-mentioned precisions in order to precisely align with the photomasks. In certain embodiments, the photo-alignment assembly locates and images the alignment markings. The imaging can include infrared optical detection so that the photo-alignment assembly can detect markings on the surface 532 of substrate 500 from the back side 514 of the substrate 500.

Figure 15:
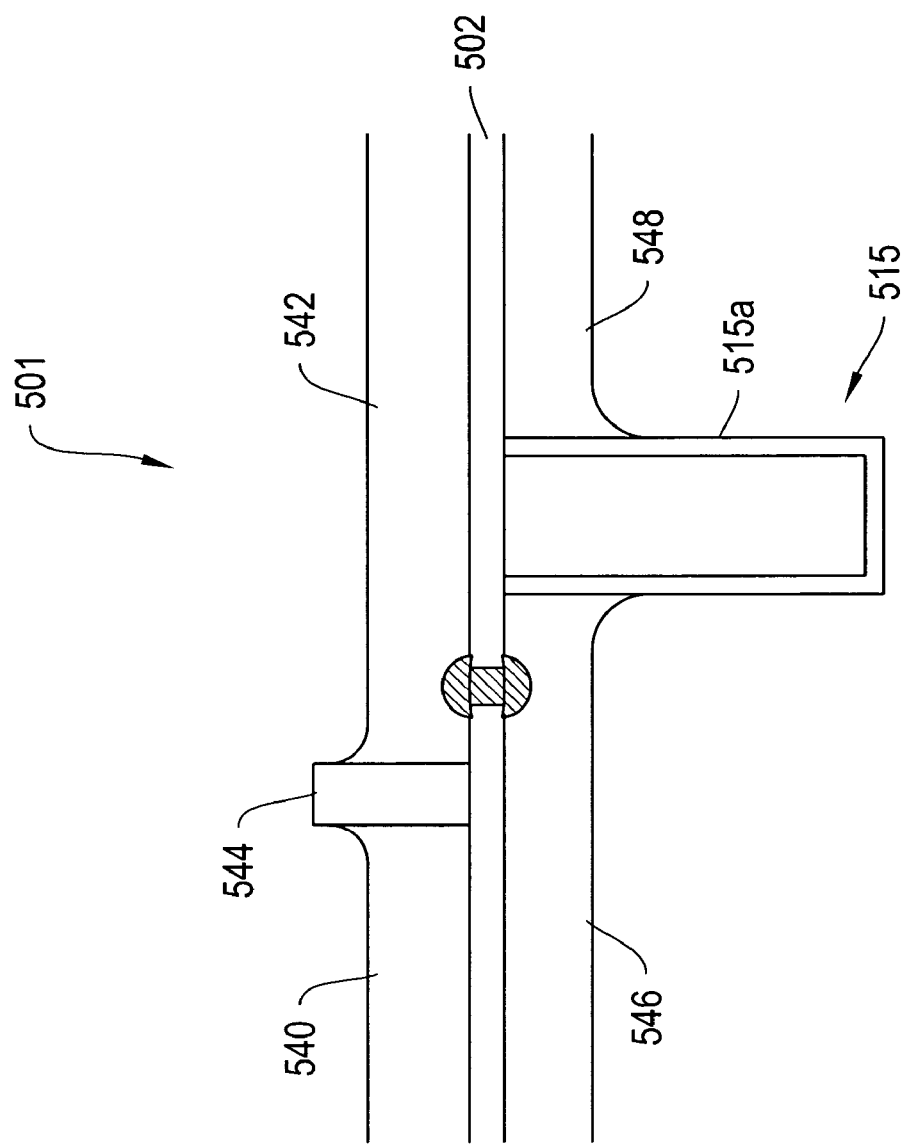
FIG. 15 shows a step in a method of fabricating a planar fuel cell stack including depositing electrodes on an electrolyte membrane, according to an illustrative embodiment of the invention.

FIG. 15 shows an exemplary technique for depositing electrode material 540 and 542 on the electrolyte membrane 502, according to an illustrative embodiment of the invention. In this technique, a manufacturer deposits a polymer mold or dam 544. The dam 544 separates one cathode 540 from another cathode 542 and defines their respective edges. In certain embodiments, the polymer 544 dam comprises a layer of liquid-based photoresist that is cured to a thickness that is greater than the desired thicknesses of the cathodes 540 and 542. The manufacturer may photodefine the dam 544 using a photomask and developer solution similar to photodefining techniques described above.

Next, the manufacturer dispenses cathode ink 540 and 542 on the electrolyte layer 502. The ink may comprise the exemplary cathode materials described above. In certain embodiments, the manufacturer needle dispenses the cathode ink. The needle may be stationary, and an alignment assembly, such as the photo-alignment assembly described above, laterally moves the electrolyte 502 and structural support 515 with respect to the stationary needle. The needle may dispense less than about 100 nanoliters of ink per drop. The drops spread over the electrolyte membrane 502 until the ink abuts against the dam 544. Next, the manufacturer fires the cathode ink 540 and 542 in, for example, oxygen at 500 degrees C. and thus burns off binders or plasticizers in the ink system. The manufacturer may optionally planarize the cathodes 540 and 542 by, for example, spinning or pressing. Subsequent to being fired, the cathodes 540 and 542 may be in a porous state to allow gas (such as oxygen or air) to diffuse through the cathodes 540 and 542. In other embodiments, the ink can be deposited using, for example, screen-printing, immersion, or dip coating, sputtering, plasma or vapor spray, and/or electrophoretic deposition.

Anodes can be patterned similarly. In the depicted embodiment, the structural support 515 itself serves as the dam to separate and define the adjacent anodes 546 and 548. After disposing anode ink 546 and 548 and cathode ink 540 and 542, the manufacturer fires the structure 501 in oxygen at 800 degrees C. to sinter particles in the anode ink 546 and 548 and cathode ink 540 and 542. This also coats the support structure 515 with an oxide coating 515a. As mentioned above, the coating 515a insulates the support structure 515 from the rest of the structure 501.

FIGS. 2-15 show planar fuel cell stacks that electrically couple fuel cell units in series. Several such planar fuel cell stacks can be arranged in a variety of configurations and in some cases embodiments are electrically coupled in a variety of ways to provide more fuel cells in a given housing and/or increase their operating efficiencies.

Figure 16:
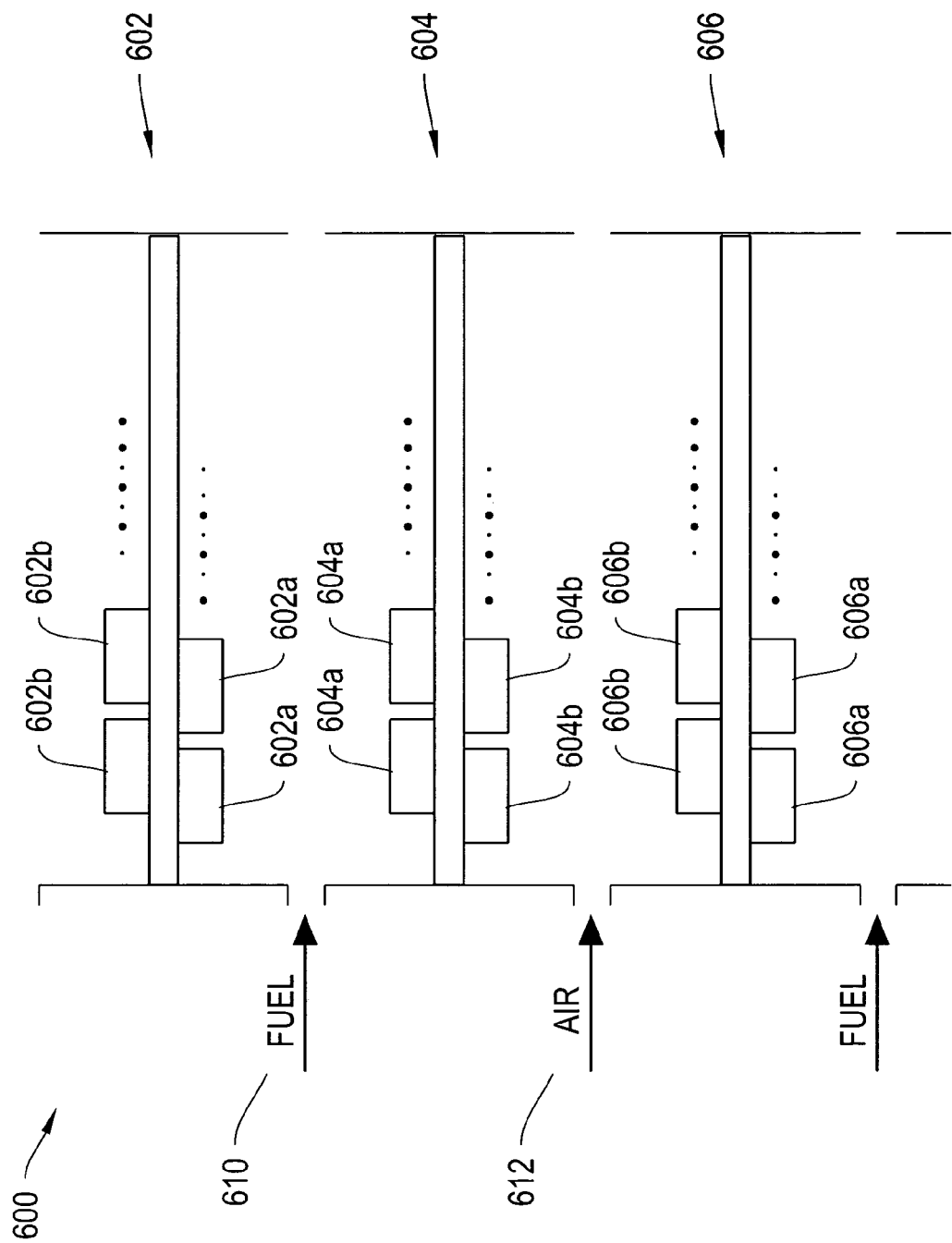
FIG. 16 shows a vertical stack of planar fuel cell stacks according to an illustrative embodiment of the invention.

More particularly, FIG. 16 shows a fuel cell assembly including a vertical stack 600 of planar fuel cell stacks 602, 604, and 606 according to an illustrative embodiment of the invention. The planar fuel cell stacks 602, 604, and 606 may include any of the exemplary planar fuel cell stacks described above. Each stack 602, 604, and 606 includes respective anodes 602a, 604a, and 606a and respective cathodes 602b, 604b, and 606b arranged to share fuel and air streams. In particular, anodes 602a and 604a share fuel stream 610, and cathodes 604b and 606b share air stream 612.

Figure 17:
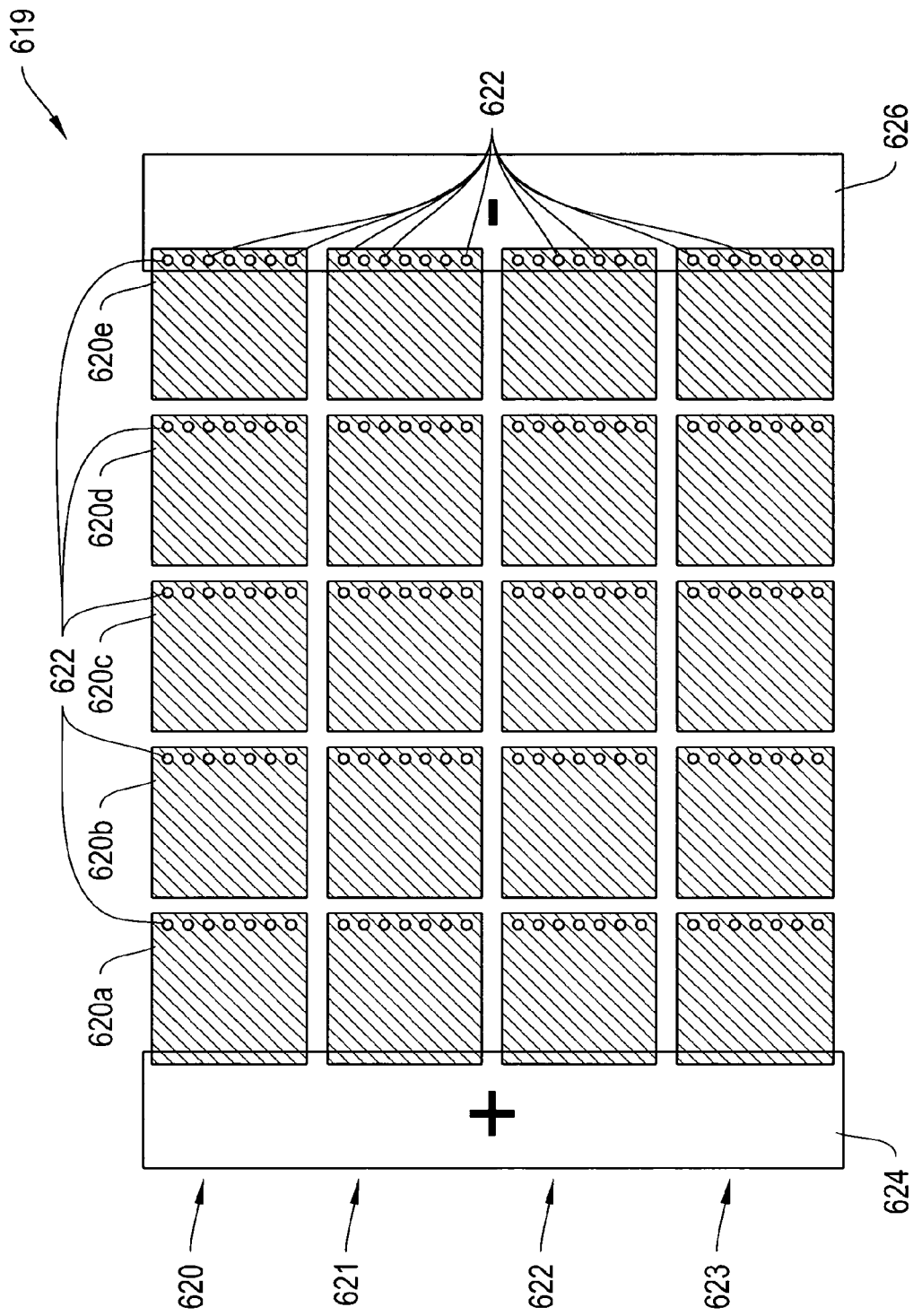
FIG. 17 shows planar fuel cell stacks including a plurality of series electrical connections of fuel cell units connected in parallel, wherein the parallel connections are formed by thin film connectors, according to an illustrative embodiment of the invention.

Groups of planar fuel cell stacks can be arranged to comprise arrays of fuel cell units. FIG. 17 shows a plurality of series electrical connections of fuel cell units connected in parallel, wherein the parallel connections are formed by thin film connectors according to an illustrative embodiment of the invention. Fuel cell assemblies that include series electrical connections of fuel cells that are connected in parallel are beneficial in part because they produce more current than the individual series connections. More particularly, FIG. 17 shows 4 rows 620, 621, 622, and 623 of fuel cell units. Each row 620, 621, 622, and 623 includes 5 fuel cells units. By way of example, row 620 includes fuel cell units 620a, 620b, 620c, 620d, and 620e that are electrically coupled in series by interconnects 622, as described above. Rows 621-623 are similar to row 620. The rows are electrically coupled in parallel by electrical connectors 624 and 626. The connector 624 couples to adjacent fuel cell units by directly contacting respective cathodes of the fuel cell units (i.e., the cathode of fuel cell 620a). Connector 626 electrically couples to adjacent fuel cell units by contacting interconnects 622 coupled to adjacent anodes (i.e., interconnects 622 that couple with the anode of fuel cell 620e).

The connectors 624 and 626 can comprise thin films of platinum that are deposited onto portions of the device by means of vacuum evaporation. A manufacturer can pattern the connectors 624 and 626 using photoresist and a photomask as described above in connection to patterning electrolyte membrane layers. In certain embodiments, a manufacturer deposits the connectors 624 and 626 before he deposits electrodes and/or before he patterns support structures. The platinum of the connectors 624 and 626 then cannot contaminate the electrodes after the electrodes are fired into a porous state. The platinum can either be formed as a dense thin film using techniques such as sputtering or vacuum evaporation, or the platinum can be formed by firing from an ink or paste formulation, whereby ink or paste is deposited by means of needle dispense, screen-printing, and immersion or dip coating.

Figure 18:
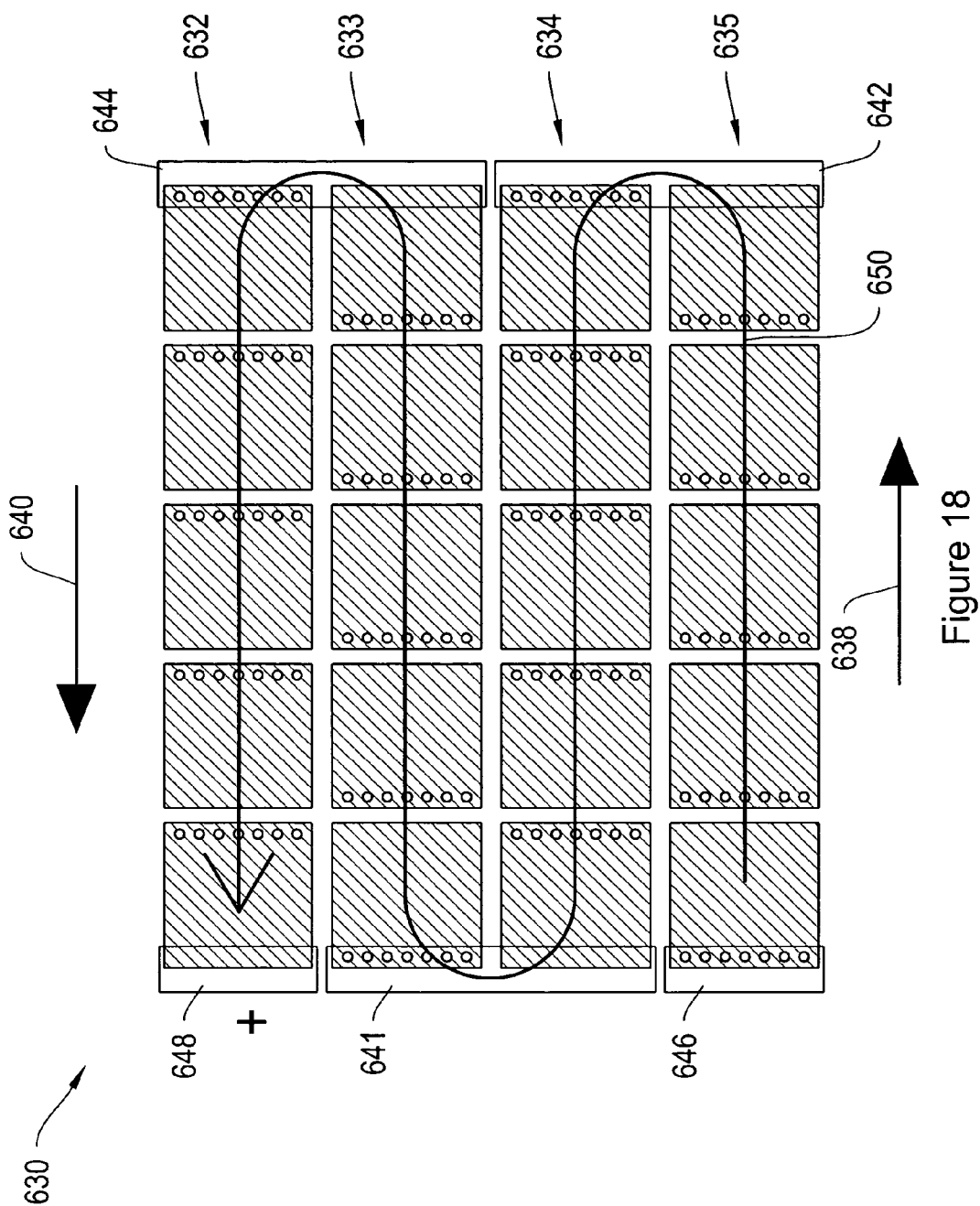
FIG. 18 shows a plurality of series electrical connections of fuel cell units connected in series, wherein the fuel cell units are arranged in a plurality of rows and the interconnections are formed by thin film connectors, according to an illustrative embodiment of the invention.

FIG. 18 shows a plurality of series electrical connections of fuel cell units connected in series, wherein the fuel cell units are arranged in a plurality of rows and the interconnections are formed by thin film connectors according to an illustrative embodiment of the invention. Fuel cell assemblies that include series connections of fuel cell units connected in series are beneficial in part because, as mentioned above, they provide higher output voltages than the individual series connections. More particularly, the fuel cell assembly 630 includes four rows 632, 633, 634, and 635 of fuel cell units that comprise a non-linear array of fuel cells. As in the assembly 619 of FIG. 17, each row 632-635 includes five fuel cell units. However, the rows direct current in alternating directions. In particular, rows 633 and 635 direct current in a first direction 638, while rows 632 and 634 direct current in a second direction 640. Electrical connectors 641, 642, and 644 couple the rows 632-635 to form a series connection of the rows 632-635. More particularly, connector 642 couples rows 634 and 635, connector 641 couples rows 633 and 634, and connector 644 couples rows 632 and 633. Connector 646 couples to electrical ground, and connector 648 couples to the output voltage of the assembly 630. An exemplary current path 650 begins at connector 646 and flows to connector 648, as depicted in FIG. 18.

Figure 19:
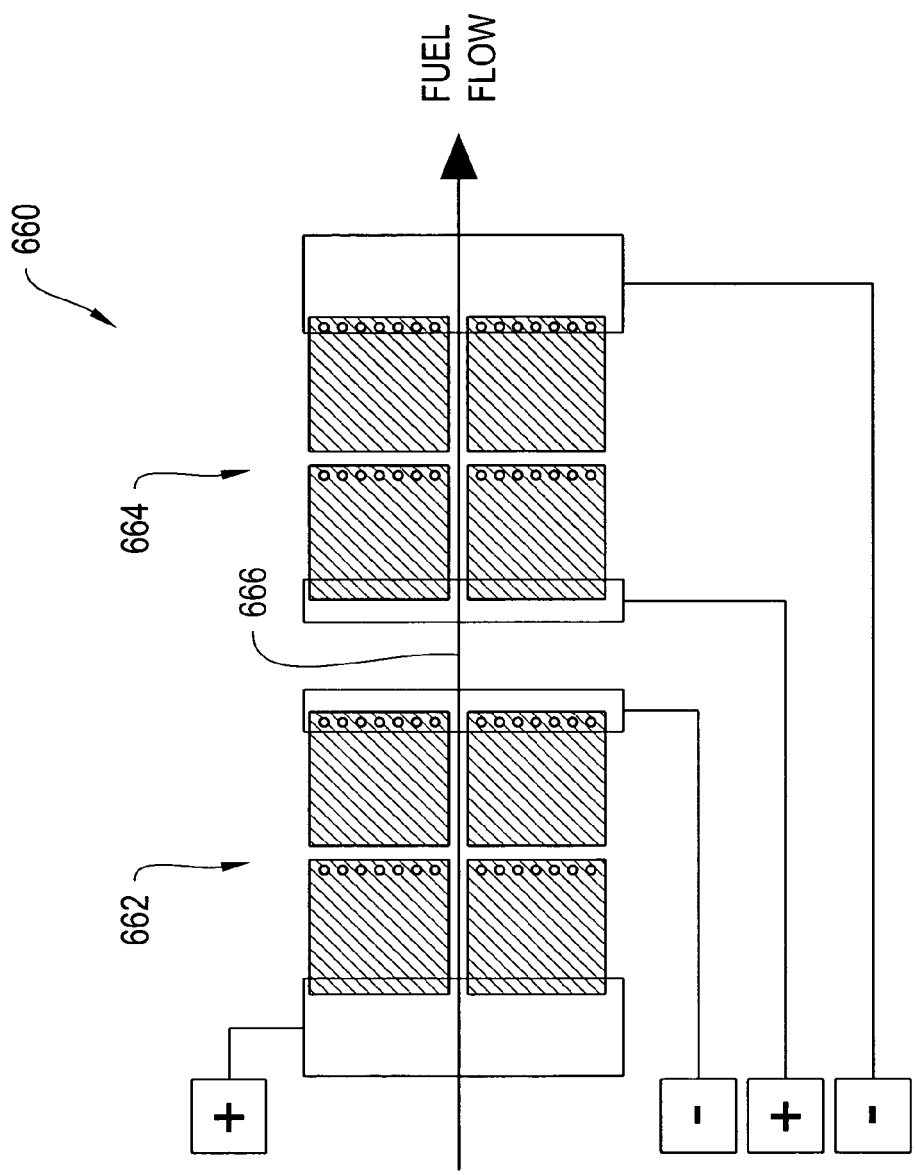
FIG. 19 shows two groups of fuel cell units, each having different outputs according to an illustrative embodiment of the invention.

In certain embodiments, fuel cell units are grouped and electrically coupled in accordance with the positions of the respective groups of fuel cell units in relation to a fuel source in order to, for example, produce more power, voltage, current, and/or provide more efficiency. More particularly, FIG. 19 shows a fuel cell assembly 660 having two groups 662 and 664 of fuel cell units. In this illustrative embodiment, a hydrogen-based fuel stream flows in a direction 666, first in contact with the anodes of the fuel cell units in group 662, and then in contact with the anodes of the fuel cell units in group 664. The hydrogen-based fuel stream 666 contains a higher concentration of hydrogen as it contacts group 662 because the fuel cell units 662 consume and react hydrogen from the hydrogen-based fuel stream 666. As a result, the hydrogen-based fuel stream 666 contains less hydrogen as it contacts the anodes of the fuel cell units in group 664. Additionally, the fuel cell units in group 662 produce byproducts such as carbon dioxide and water, which dilute the concentration of hydrogen in the hydrogen-based fuel stream 666. Because of this varying concentration of hydrogen along fuel stream 666, groups 662 and 664 will operate with varying power densities and efficiencies.

Figure 20:
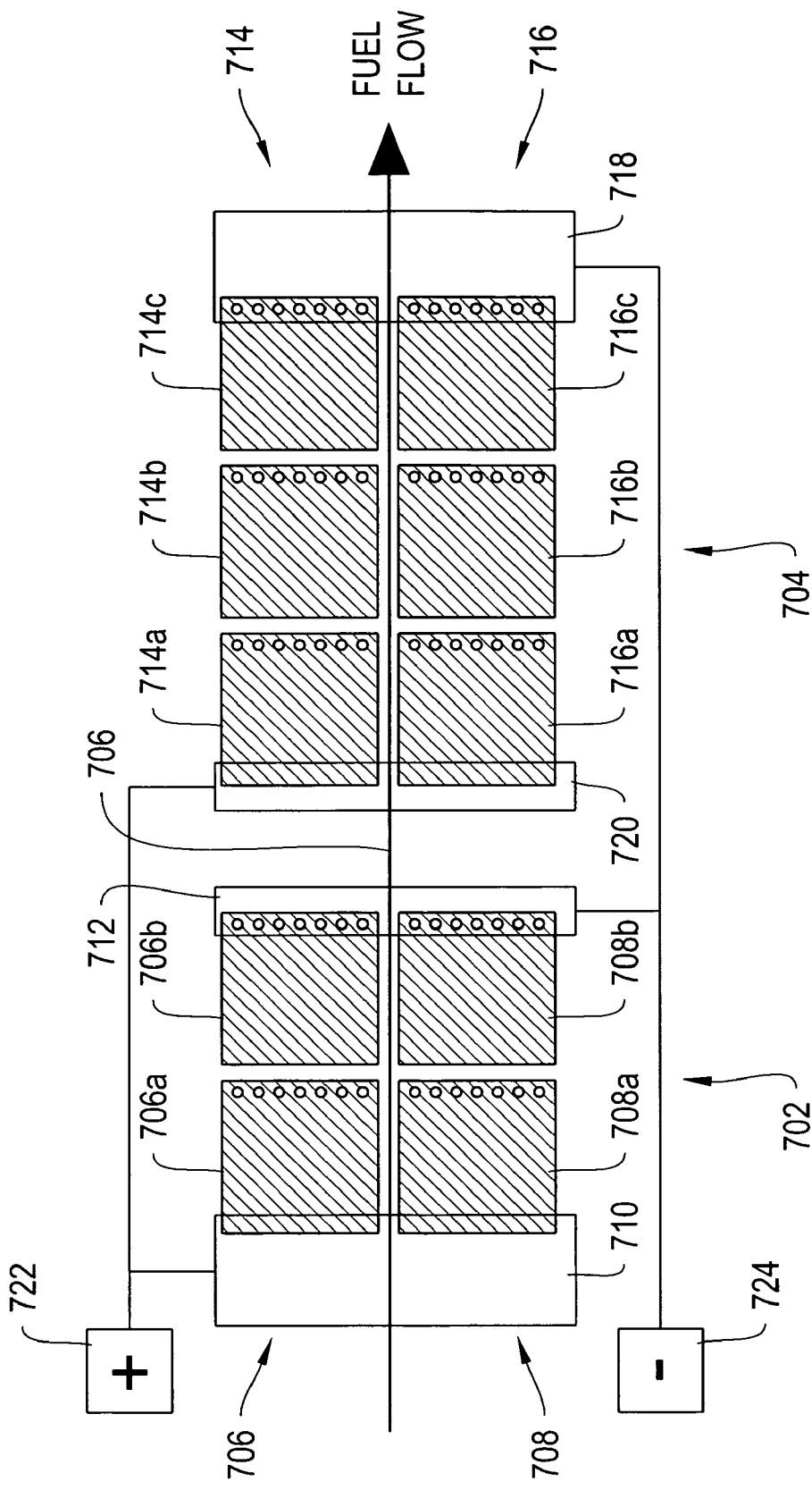
FIG. 20 shows two groups of fuel cell units, wherein one group is located downstream along a fuel stream and has a higher current density than the other group, according to an illustrative embodiment of the invention.

In one implementation, different groups of fuel cells include respective different configurations of fuel cell units in order to drive the groups with different current densities to in part compensate for the varying power densities described above, and correspondingly improve overall power density. FIG. 20 shows two groups 702 and 704 of fuel cell units wherein group 704 is located downstream along the fuel stream 706 and, as will now be discussed, has a higher current density than group 702. More particularly, group 702 includes two rows 706 and 708 of two fuel cell units each (706a-b and 708a-b respectively), and the two rows 706 and 708 are connected in parallel by connectors 710 and 712. Group 704 has two rows 714 and 716 of three fuel cell units each (714a-c and 716a-c respectively), and the two rows 714 and 716 are connected in parallel by connectors 718 and 720. Connectors 710 and 720 both electrically couple to connector 722, and connectors 712 and 718 both electrically couple to connector 724. Thus, groups 702 and 704 are connected in a parallel electrical connection, and this contains the output voltage of the groups 702 and 704 to be the same. Group 704 includes more fuel cell units, and as a result will have a lower voltage per fuel cell unit and a corresponding higher current density.

A manufacturer can adjust the current densities for groups 702 and 704 by adding or removing fuel cell units from groups 702 and 704. In certain embodiments, the manufacturer may include more fuel cell units in group 702 than in group 704.

Figure 21:
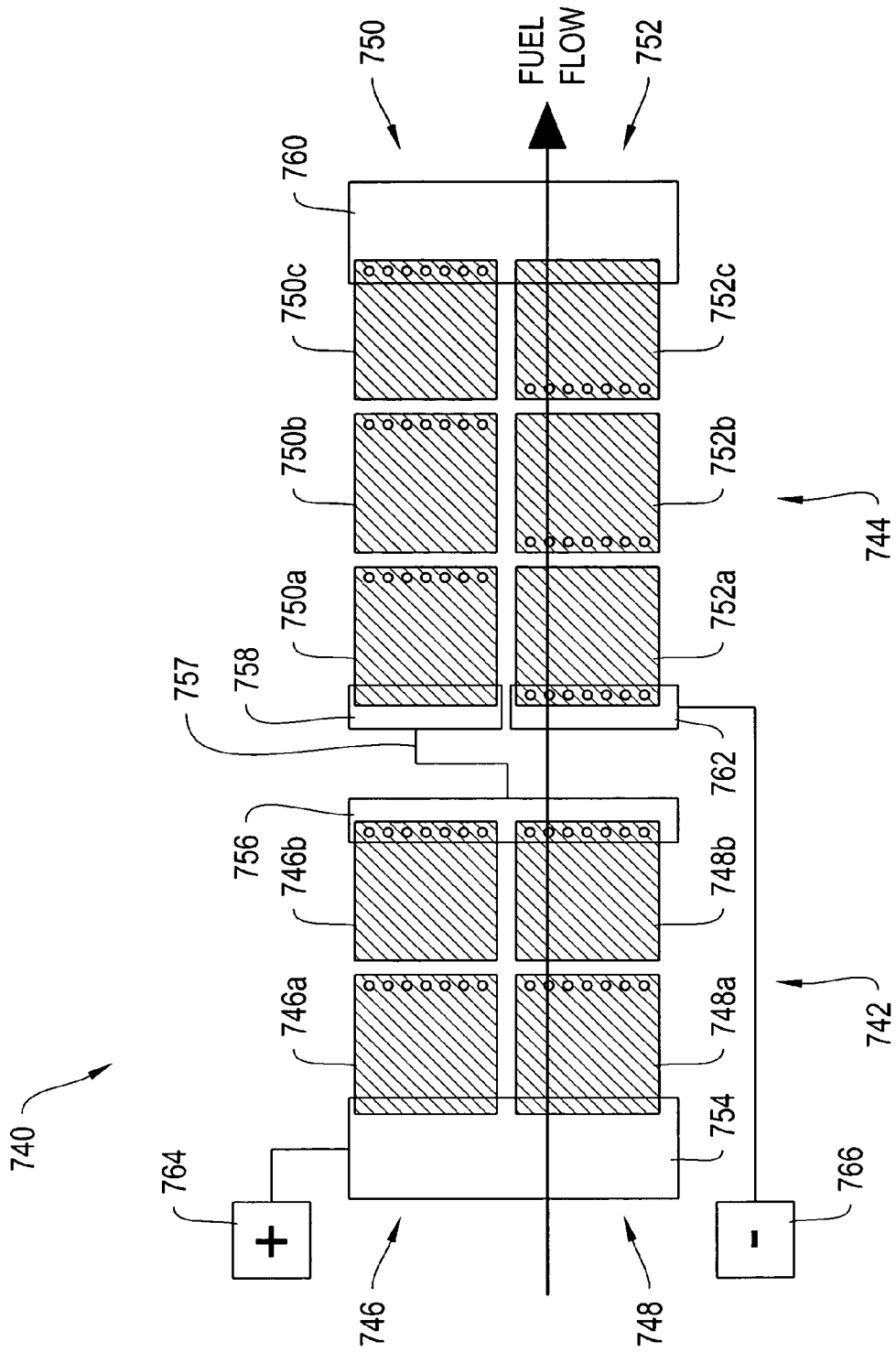
FIG. 21 shows a fuel cell assembly that includes two groups of fuel cell units, each having a different number of fuel cells, and further including various combinations of series and parallel interconnections among the fuel cell units, according to an illustrative embodiment of the invention.

FIG. 21 shows a fuel cell assembly 740 that includes two groups of fuel cell units, each having a different number of fuel cells, and further including various combinations of series and parallel interconnections among the fuel cell units according to an illustrative embodiment of the invention. More particularly, the fuel cell assembly 740 includes two groups 742 and 744. Group 742 includes two rows 746 and 748 of two fuel cell units each (746a-b and 748a-b respectively). The two rows 746 and 748 are connected in parallel by connectors 754 and 756. The group 744 includes two rows 750 and 752 of three of fuel cell units each (750a-c and 752a-c respectively). The rows 750 and 752 are connected in series by connector 760. Groups 742 and 744 are connected in series by en electrical connection 757 between connector 756 and connector 758. Connector 766 is electrically coupled to ground, and connector 764 provides the output voltage differential of the configuration 740. Since blocks 742 and 744 are connected in series, the currents flowing through them are constrained to be about the same. However, since substantially all of the current flowing through block 742 flows through rows 750 and 752, the current density of fuel cell units in group 744 is higher than that of group 742.

Figure 22:
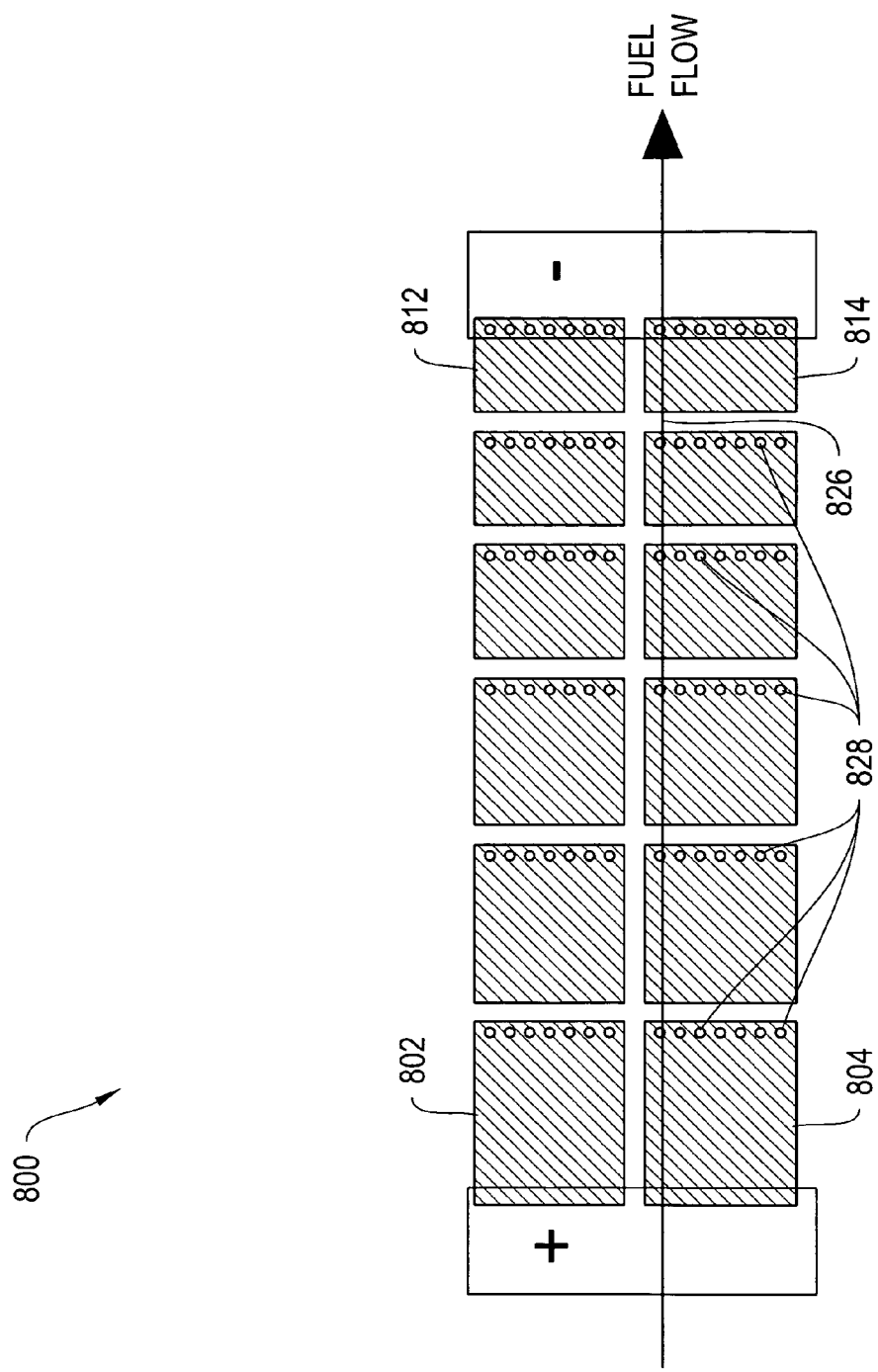
FIG. 22 shows a plurality of fuel cell units and a fuel stream wherein the fuel cell units are sized according to their respective locations along a the fuel stream, according to an illustrative embodiment of the invention.

In addition to configuring groups of fuel cell units differently based on their respective locations with respect to a fuel source in order to adjust current densities that drive the fuel cell units, individual fuel cell units can be sized and shaped differently based their respective locations with respect to a fuel source. More particularly, FIG. 22 shows a fuel cell assembly 800 including a plurality of fuel cell units and a fuel stream 826. In this illustrative embodiment, fuel cell sizes decrease along a downstream direction of the fuel stream 826. For example, fuel cell units 802 and 804, located at an upstream location along the fuel stream 826, are larger (i.e., have larger active regions) than fuel cell units 812 and 814, located at a downstream location along the fuel stream 826. In one exemplary fabrication technique, a manufacturer applies photoresist and a photomask in order to vary the locations of the interconnects 828 and structural supports (not depicted) disposed laterally between fuel cell units to vary the sizes of the fuel cell units.

Since downstream fuel cell units such as fuel cell units 812 and 814 have smaller areas, they will have larger current densities than upstream fuel cell units such as fuel cell units 802 and 804. However, in alternate embodiments, downstream fuel cell units have larger active areas, which may be advantageous in certain situations.

The configurations, devices, and methods described above can be used in any operative combination with other configurations, devices, and methods, including those described in U.S. Patent and Publication Nos. 2005/0069737; 2005/0132648; 6,939,632; 2004/0241061; 2004/0072039; 2005/0249993; 6,680,139; 2004/0028975; 6,852,436; 6,623,881; 2003/0096147; 2005/0221131; 5,925,477; 5,190,834; 5,479,178; 6,183,897; and 5,595,833, all of which are incorporated herein by reference in their entireties.

The fuel cell assemblies discussed above may be any type of fuel cell, such as solid-oxide fuel cells and/or proton exchange membrane fuel cells (PEM). They may be provided in a housing which integrates one or more of the functions of a fuel reformer, a set of fuel cell membranes, a tail gas burner, and all internal fluid manifolds in one thermal zone, can be fabricated through any number of fabrication techniques. In particular, embodiments of the invention can be fabricated using MEMS techniques (micro-electro-mechanical systems) or micromachining techniques. Such techniques make it possible to integrate thin film materials (for instance thin film electrolytes, anodes, cathodes and/or electrical connections) along with etched microchannels for control of fluid flow onto a common substrate that is thermally conductive and mechanically robust.

For example, an integrated housing can be assembled from a group of substantially planar or non-planar semiconductor structures. Specifically, five silicon substrates can be bonded together to form the "box" that various fuel cell apparatus components are integrated within. Bonding together the five silicon substrates, results in a stacked configuration. In one embodiment, the substrates can be stacked as follows: (1) fuel reformer substrate including fluidic interconnects; (2) a membrane electrode assembly, (3) a fluid routing layer, (4) another membrane electrode assembly, and (5) a top fluid routing layer including tail gas burner. Thus, a stack of layers can form some or all of the integrated fuel cell apparatus.

In certain embodiments, silicon is chosen as the substrate for building the fuel cell membranes and other manifold structures. However, micromachining techniques also exist for building fluid flow channels in rigid wafers of glass and ceramic, all materials which possess the high temperature strength required for solid oxide fuel cells. In order to prevent electrical shorting between different points of the membrane assembly, a silicon substrate can be coated with layers of silicon oxide or silicon nitride to render it electrically insulating.

Etched fluidic microchannels are formed in the above substrates by a variety of techniques, including wet and dry chemical etching, laser ablation, diamond milling, tape casting, or injection molding. A variety of substrate or wafer bonding techniques are available including fusion bonding, anodic bonding, sealing by means of eutectic solder materials or thin films, or sealing by means of glass frits.

Fuel cell assemblies, including the anode, cathode, and electrolyte can be deposited by a variety of thin and thick film deposition techniques including sputtering, evaporation, chemical vapor deposition, laser ablation, screen-printing, dip coating, or vapor spray techniques.

While this invention has been particularly shown and described with references to preferred embodiments thereof, it will be understood by those skilled in the art that various changes in form and details may be made therein without departing from the scope of the invention encompassed by the appended claims.

What is claimed is:

1. A planar fuel cell stack of a plurality of fuel cells comprising:
    an anode layer including a first anode and a second anode,
    an electrolyte layer,
    a cathode layer including a first cathode and a second cathode,
    at least one interconnect at least partially disposed within, and interfacing with, the electrolyte layer, and electrically and mechanically coupling the first anode and the second cathode, and
    a structural support having an axis oriented perpendicular to a plane extending through the planar stack, the structural support coupled to one of the anode layer and the cathode layer in at least a portion of an inactive region of the stack, wherein the structural support is dimensioned so as to leave substantially uncovered an active region of the stack laterally adjacent to the structural support.

2. The fuel cell stack of claim 1, wherein the plurality of fuel cells operate at a temperature of more than about 400 degrees Celsius.

3. The fuel cell stack of claim 1, further comprising a second structural support having an axis oriented perpendicular to a plane extending through the planar stack, the second structural support coupled to one of the anode layer and the cathode layer in at least a portion of a second inactive region of the stack, wherein the second structural support is dimensioned so as to leave substantially uncovered an active region of the stack laterally adjacent to the structural support and spaced apart from the structural support.

4. The fuel cell stack of claim 1, wherein the structural support includes an insulating material.

5. The fuel cell stack of claim 1, wherein the structural support includes an electrically insulating coating.

6. The fuel cell stack of claim 1, wherein the structural support includes an oxidized surface.

7. The fuel cell stack of claim 1, wherein the structural support includes one or more of a silicon material, a yttria stabilized zirconia (YSZ) material, a magnesium oxide material, a ferrochromium material, and a ceramic material.

8. The fuel cell stack of claim 1, wherein the structural support has a width of between about 30 microns and about 200 microns, and a height of greater than about 100 microns.

9. The fuel cell stack of claim 1, wherein at least a portion of the structural support is aligned with the at least one interconnect on an axis perpendicular to a plane extending through the fuel cell stack.

10. The stack of claim 1, wherein
the first anode and the second anode are laterally separated by a first distance,
the first cathode and the second cathode are laterally separated by a second distance, and
at least one of the first distance and the second distance is between about 5 microns and about 500 microns.

11. The stack of claim 10, wherein at least one of the first distance and the second distance is between about 5 microns and about 200 microns.

12. The stack of claim 1, wherein the electrolyte layer includes
a first electrolyte region disposed between the first anode and the first cathode and providing a first voltage differential between the first anode and the first cathode;
a second electrolyte region disposed between the second anode and the second cathode and providing a second voltage differential between the second anode and the second cathode; and
the first electrolyte region and the second electrolyte region comprise a monolithic electrolyte structure.

13. The stack of claim 1, comprising a solid-oxide fuel cell.

14. The stack of claim 1, further comprising
a plurality of active regions, wherein the active regions comprise at least 70% of an area of a surface of the electrolyte layer.

15. The stack of claim 1, wherein the stack is contained within a housing having a volume of less than about 30 cubic centimeters.

16. The stack of claim 15, wherein the stack produces a voltage differential of more than about 10 volts.

17. The stack of claim 1, further comprising a plurality of interconnects at least partially disposed within, and interfacing with, the electrolyte layer, and electrically and mechanically coupling the first anode and the second cathode.

18. The stack of claim 1, including a plurality of interconnects that comprise a linear array of interconnects, wherein the center-to-center spacings of adjacent ones of the plurality of interconnects are substantially equal.

19. The stack of claim 1, wherein the at least one interconnect has a cross-section parallel to a plane extending through the electrolyte layer of less than about 100 microns$^2$.

20. The stack of claim 1, further comprising
three or more fuel cells electrically connected in series, wherein the three or more fuel cells comprise a non-linear array of fuel cells.

21. The stack of claim 1, further comprising
two or more series electrical connections of the fuel cells coupled in a parallel electrical connection.

22. The stack of claim 1, wherein two adjacent electrodes have a space separating the adjacent electrodes and each adjacent electrode has an end facing the other adjacent electrode, each end adjacent to the space, wherein the structural support is at least partially disposed in the space between each end of the two adjacent electrodes and is coupled to the electrolyte layer.

23. The stack of claim 22, further comprising a second structural support having an axis oriented perpendicular to a plane extending through the planar stack, the second structural support coupled to one of the anode layer and the cathode layer in at least a portion of a second inactive region of the stack, wherein the second structural support is dimensioned so as to leave substantially uncovered an active region of the stack laterally adjacent to the structural support, wherein the second structural support is at least partially disposed between another two adjacent electrodes and is coupled to the electrolyte layer.

24. The stack of claim 22, wherein the plurality of fuel cells comprise solid oxide fuel cells.

25. The fuel cell stack of claim 22, wherein the structural support has a width of between about 30 microns and about 200 microns, and a height of greater than about 100 microns.

26. The stack of claim 22, wherein
the first anode and the second anode are laterally separated by a first distance,
the first cathode and the second cathode are laterally separated by a second distance, and
at least one of the first distance and the second distance is between about 5 microns and about 500 microns.

27. The stack of claim 22, wherein the stack is contained within a housing having a volume of less than about 30 cubic centimeters.

28. The stack of claim 27, wherein the stack produces a voltage differential of more than about 10 volts.

29. A fuel cell assembly comprising:
a housing having a volume of less than about 30 cubic centimeters, and
a planar fuel cell stack contained in the housing and having
an anode layer including a plurality of anodes arranged in a first plane,
a cathode layer including a plurality of cathodes arranged in a second plane,
an electrolyte layer disposed between the anode layer and the cathode layer,
at least one interconnect at least partially disposed within, and interfacing with,
the electrolyte layer, and coupled to a first anode and a first cathode, and
a structural support having an axis oriented perpendicular to a plane extending through the planar stack, the structural support coupled to one of the anode layer and the cathode layer in at least a portion of an inactive region of the stack, wherein the structural support is dimensioned so as to leave substantially uncovered an active region of the stack laterally adjacent to the structural support.

30. The assembly of claim 29, wherein the planar fuel cell stack operates at a temperature of more than about 400 degrees Celsius.

31. The assembly of claim 29, wherein the planar fuel cell stack comprises solid oxide fuel cells.

32. The assembly of claim 29, wherein the active region comprises at least about 70% of an area of the surface of the electrolyte layer.

33. The assembly of claim 29, wherein the active regions comprise at least about 85% of an area of the surface of the electrolyte layer.

34. A fuel cell assembly comprising:
a housing, and
a planar fuel cell stack contained in the housing and having
respective anodes arranged in an anode layer,
respective cathodes arranged in a cathode layer,
an electrolyte layer,
at least one interconnect at least partially disposed within, and interfacing with, the electrolyte layer, and coupled to a first anode and a first cathode, and
a structural support having an axis oriented perpendicular to a plane extending through the planar stack, the structural support coupled to one of the anode layer and the cathode layer in at least a portion of an inactive region of the stack, wherein the structural support is dimensioned so as to leave substantially uncovered an active region of the stack laterally adjacent to the structural support,
wherein the fuel cell assembly produces more than about 0.1 volts per cubic centimeter of the housing.

35. The assembly of claim 34, wherein the planar fuel cell stack operates at a temperature of more than about 400 degrees Celsius.

36. The assembly of claim 34, wherein the planar fuel cell stack comprises solid oxide fuel cells.

37. The assembly of claim 34, wherein the fuel cell assembly produces more than about 0.5 volts per cubic centimeter of the housing.

38. The assembly of claim 34, wherein the housing has a volume of less than about 30 cubic centimeters.

39. A fuel cell assembly, comprising
a housing having a volume of between about 0.1 cubic centimeters and about 30 cubic centimeters, and
a planar fuel cell stack having
an anode layer including a plurality of anodes arranged in a first plane,
a cathode layer including a plurality of cathodes arranged in a second plane,
an electrolyte layer disposed between the anode layer and the cathode layer,
at least one interconnect at least partially disposed within, and interfacing with, the electrolyte layer, and coupled to a first anode and a first cathode, and
a structural support having an axis oriented perpendicular to a plane extending through the planar stack, the structural support coupled to one of the anode layer and the cathode layer in at least a portion of an inactive region of the stack, wherein the structural support is dimensioned so as to leave substantially uncovered an active region of the stack laterally adjacent to the structural support,
wherein-the active region has an area on a surface of the electrolyte layer of between about 0.5 square centimeters and about 100 square centimeters.

40. The fuel cell assembly of claim 39, wherein the planar fuel cell stack operates at a temperature of more than about 400 degrees Celsius.

41. The assembly of claim 39, wherein the planar fuel cell stack comprises solid oxide fuel cells.

42. The fuel cell stack of claim 1, wherein the structural support has an elongated dimension oriented perpendicular to the plane extending through the planar stack.

43. The fuel cell stack of claim 1, wherein the structural support is at least partially disposed between the first and the second anode and is coupled to one of the first cathode and the second cathode through the electrolyte layer.

44. The fuel cell stack of claim 1, wherein the structural support is at least partially disposed between the first and the second cathode and is coupled to one of the first anode and the second anode through the electrolyte layer.

* * * * *